US008681517B2

(12) United States Patent
Itoh et al.

(10) Patent No.: US 8,681,517 B2
(45) Date of Patent: Mar. 25, 2014

(54) AC CONVERTER, AC CONVERTING METHOD, AND STORAGE MEDIUM FOR CONVERTING AN AC VOLTAGE WITH A RELATIVELY HIGH FREQUENCY INTO AN AC VOLTAGE WITH A RELATIVELY LOW FREQUENCY

(75) Inventors: Junichi Itoh, Niigata (JP); Hiroshi Yamamoto, Osaka (JP); Tomokazu Sada, Osaka (JP)

(73) Assignee: Panasonic Corporation, Osaka (JP)

( * ) Notice: Subject to any disclaimer, the term of this patent is extended or adjusted under 35 U.S.C. 154(b) by 157 days.

(21) Appl. No.: 13/298,454

(22) Filed: Nov. 17, 2011

(65) Prior Publication Data
US 2012/0300511 A1 Nov. 29, 2012

(30) Foreign Application Priority Data
May 26, 2011 (JP) ................................. 2011-118293

(51) Int. Cl.
| H02M 5/45 | (2006.01) |
| H02M 3/24 | (2006.01) |
| H02M 3/335 | (2006.01) |
| H02M 7/06 | (2006.01) |
| H02M 7/5387 | (2007.01) |

(52) U.S. Cl.
USPC ................ 363/37; 363/17; 363/97; 363/98; 363/126; 363/132

(58) Field of Classification Search
USPC .......................... 363/17, 37, 97, 98, 126, 132
See application file for complete search history.

(56) References Cited

U.S. PATENT DOCUMENTS 5,926,381 A * 7/1999 Moriguchi et al. ............. 363/17
6,320,775 B1 * 11/2001 Ito et al. ........................ 363/132

(Continued)

FOREIGN PATENT DOCUMENTS

| JP | 09-168205 A | 6/1997 |
| JP | 09-261967 A | 10/1997 |

(Continued)

OTHER PUBLICATIONS

Nakata et al., "An Experimental Verification of a Single-phase-to-three-phase Matrix Converter Using PDM Control for High Frequency Applications".*

(Continued)

*Primary Examiner* — Timothy J Dole
*Assistant Examiner* — Yusef Ahmed
(74) *Attorney, Agent, or Firm* — Renner, Otto, Boisselle & Sklar, LLP

(57) ABSTRACT

An AC converter includes: a switching section, which converts the input AC voltage in response to a control signal and which outputs the converted voltage to a phase that has been selected in accordance with the control signal; a filter section, which filters out high frequency components from the converted voltage, thereby converting the converted voltage into the output AC voltage; and a switching control section, which performs a pulse density modulation on a phase-by-phase basis and in response to a reference signal with the frequency f1, which is associated with the output AC voltage of each phase, synchronously with a zero cross of the input AC voltage, thereby generating the control signal according a pulse generation status by the pulse density modulation and the polarity of the input AC voltage and sending out the control signal to the switching section.

18 Claims, 20 Drawing Sheets

(56) References Cited

U.S. PATENT DOCUMENTS

| | | |
|---|---|---|
| 6,850,424 B2 * | 2/2005 | Baudelot et al. .................. 363/37 |
| 7,660,135 B2 * | 2/2010 | Fang ............................... 363/17 |
| 8,451,637 B1 * | 5/2013 | Alexander ....................... 363/50 |
| 2008/0104983 A1 * | 5/2008 | Yamai et al. ................... 62/228.1 |
| 2008/0278264 A1 | 11/2008 | Karalis et al. |
| 2009/0251086 A1 * | 10/2009 | Sekimoto et al. ......... 318/400.23 |
| 2010/0014334 A1 * | 1/2010 | Katou et al. .................... 363/126 |
| 2010/0020581 A1 * | 1/2010 | Mazzola et al. .............. 363/132 |
| 2010/0244570 A1 * | 9/2010 | Sakakibara ..................... 307/75 |
| 2010/0309700 A1 * | 12/2010 | Maeda et al. .................. 363/126 |
| 2011/0026285 A1 * | 2/2011 | Kawashima et al. .......... 363/127 |
| 2012/0201056 A1 * | 8/2012 | Wei et al. ........................ 363/37 |

FOREIGN PATENT DOCUMENTS

| | | |
|---|---|---|
| JP | 11-346478 A | 12/1999 |
| JP | 2002-218656 A | 8/2002 |
| JP | 3334742 B | 8/2002 |
| JP | 2004-266972 A | 9/2004 |
| JP | 2005-006463 A | 1/2005 |
| JP | 2007-306709 A | 11/2007 |
| JP | 2009-106110 A | 5/2009 |
| JP | 2011-015558 A | 1/2011 |

OTHER PUBLICATIONS

International Search Report for corresponding International Application No. PCT/JP2011/006195 mailed Jan. 17, 2012.

Form PCT/ISA/237 for corresponding International Application No. PCT/JP2011/006195 dated Jan. 17, 2012 and Partial English translation.

Nakata et al., "An Experimental Verification of a Single-phase-to-three-phase Matrix Converter Using PDM Control for High Frequency Applications", The Papers of Technical Meeting, IEE Japan, vol. SPC-11, No. 1-17, 19-24, Jan. 21, 2011, pp. 109-114.

Nakata et al., "A Basic Analysis of a Single-phase-to-three-phase Matrix Converter Using PDM Control for-High Frequency Applications", A Paper of Technical Workshop in Niigata, Tokyo Branch of IEE Japan, No. IV-07, Nov. 27, 2010, p. 114 and concise explanation.

Nakata et al., "A Consideration about Effect of a Power Source Side Impedance for a High-frequency Single-phase-to-three-phase Matrix Converter using PDM Control", Annual Conference of IEE Japan, 4-027, Mar. 4, 2011, pp. 51-52, vol. 4 and concise explanation.

* cited by examiner

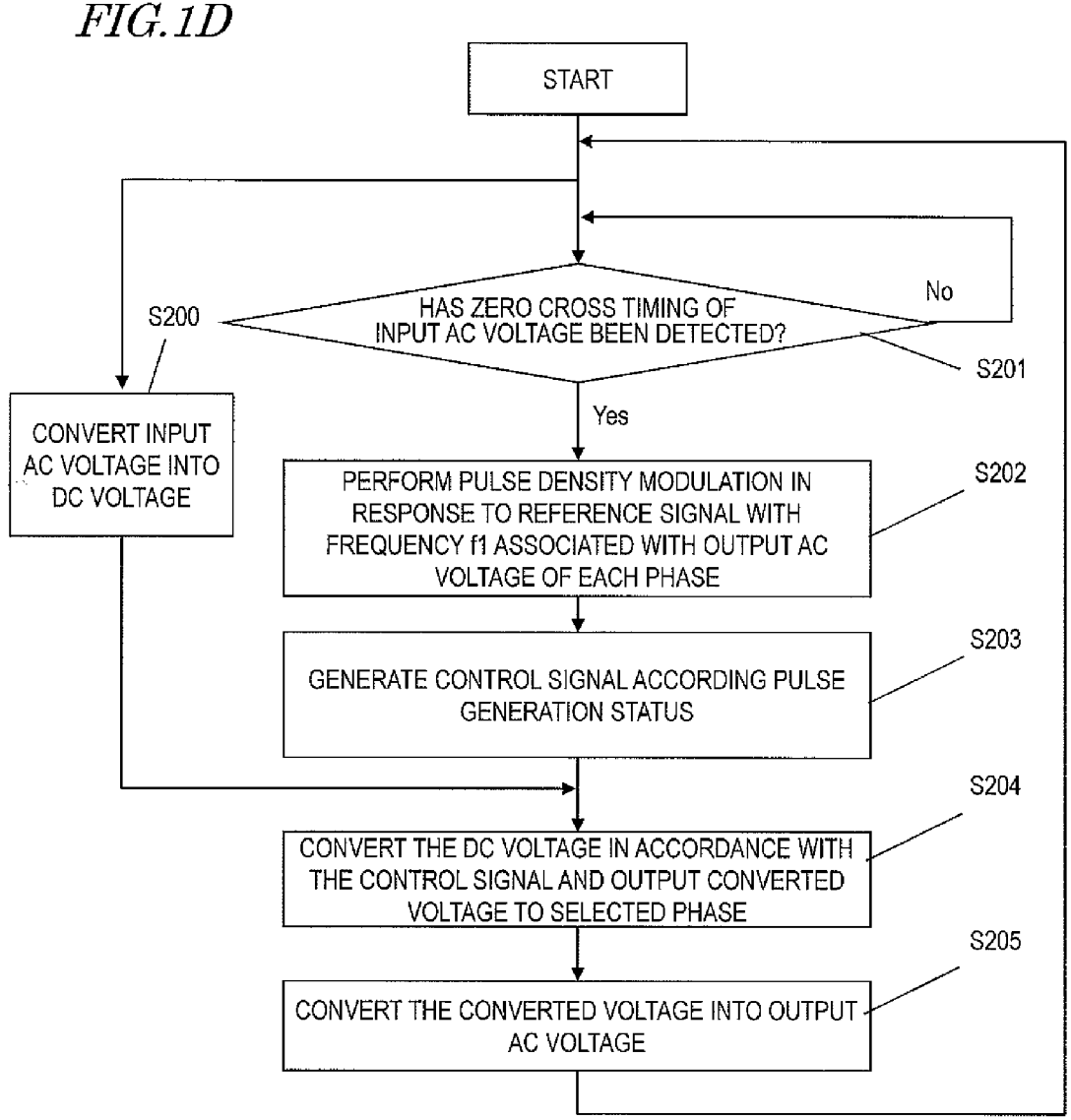

*FIG.2*
(a)
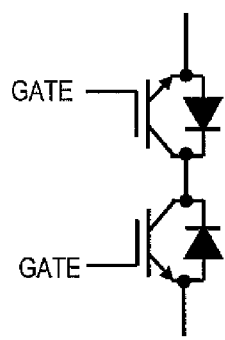
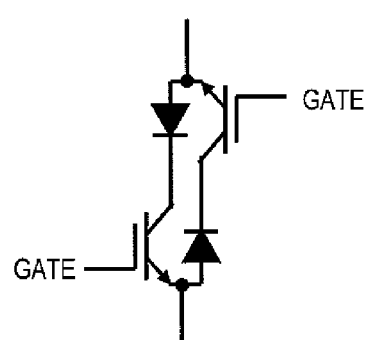
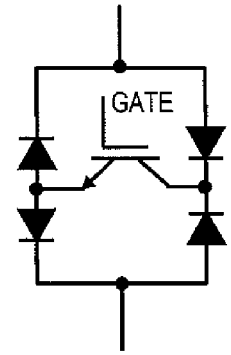
SERIES TYPE　　　PARALLEL TYPE　　　DIODE BRIDGE TYPE
(b)
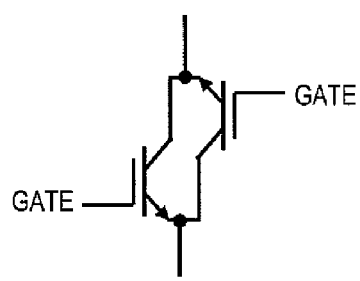

FIG.4

| INPUT VOLTAGE POLARITY | PHASES TO OUTPUT TO | OUTPUT VOLTAGE POLARITY | U | V | W | X | Y | Z |
|---|---|---|---|---|---|---|---|---|
| + | uv | + | ON | | | | ON | |
| | | − | | ON | | ON | | |
| | vw | + | | ON | | | | ON |
| | | − | | | ON | | ON | |
| | wu | + | | | ON | ON | | |
| | | − | ON | | | | | ON |
| − | uv | + | | | ON | ON | | |
| | | − | | ON | | | ON | |
| | vw | + | | | ON | ON | | |
| | | − | | ON | | | | ON |
| | wu | + | ON | | | | | ON |
| | | − | | | ON | ON | | |

*FIG.8*

| PHASES TO OUTPUT TO | OUTPUT VOLTAGE POLARITY | U | V | W | X | Y | Z |
|---|---|---|---|---|---|---|---|
| UV | + | ON | | | | ON | |
| UV | − | | ON | | ON | | |
| VW | + | | ON | | | | ON |
| VW | − | | | ON | | ON | |
| WU | + | | | ON | ON | | |
| WU | − | ON | | | | | ON |

PRIOR ART

AC CONVERTER, AC CONVERTING METHOD, AND STORAGE MEDIUM FOR CONVERTING AN AC VOLTAGE WITH A RELATIVELY HIGH FREQUENCY INTO AN AC VOLTAGE WITH A RELATIVELY LOW FREQUENCY

BACKGROUND OF THE INVENTION

1. Field of the Invention

The present invention relates to a technique for converting an AC voltage with a relatively high frequency into an AC voltage with a relatively low frequency.

2. Description of the Related Art

Recently, various power transmission methods that use resonant magnetic coupling have been proposed to provide a system that transmits power by a non-contact method. United States Patent Application Publication No. 2008/0278264 (which will be referred to herein as Patent Document No. 1 for convenience sake) discloses a new type of wireless energy transfer system for transferring energy from one of two resonators to the other, and vice versa, through the space between them by utilizing an electromagnetic coupling phenomenon that produces between those two resonators. That wireless energy transfer system couples the two resonators with each other via the evanescent tail of the oscillation energy of the resonant frequency that is produced in the space surrounding those two resonators, thereby transferring the oscillation energy wirelessly (i.e., by a non-contact method).

In that wireless power transmission system, the output power of the resonators is AC power that has as high a frequency as the resonant frequency, which is usually set to be 100 kHz or more. If that high frequency AC power needs to be supplied to general household users, the AC power should be converted into an AC power with as low a frequency as 50/60 Hz for use in a utility power grid. Also, if that high frequency AC power is used to control the rotation of a motor directly, the AC power should be converted into an AC power with a required output frequency.

On the other hand, an inverter technology may be used to convert an AC power with a predetermined frequency into an AC power with an arbitrary frequency. Japanese Patent Application Laid-Open Publication No. 11-346478 (which will be referred to herein as "Patent Document No. 2" for convenience sake) discloses a normal inverter technology. According to the converting method of Patent Document No. 2, an incoming AC power is once converted into a DC power, and then current flowing directions are changed with respect to a load by using multiple switching elements, thereby obtaining an AC power. In that case, the output frequency is determined by the frequency at which those switching elements are turned ON and OFF.

FIG. 14 illustrates a configuration for an AC converter on the power receiving end for converting a high-frequency single-phase AC power for use in a wireless power transmission system, for example, into a three-phase AC power with a lower frequency by the conventional inverter technology. This AC converter includes a rectifying section 1401 for converting an incoming high-frequency AC power into a DC power, an inverter section 1402 for supplying the output voltage of the rectifying section 1401 to respective phases using multiple switching elements, and a low-pass filter section 104 including multiple low-pass filters that are provided for the respective phases (and which will be simply referred to herein as "filters"). The AC converter further includes a switching control section 1403 for controlling the operations of those switching elements that are included in the inverter section 1402.

Hereinafter, it will be described how the AC converter shown in FIG. 14 operates. First of all, the incoming high-frequency AC power is converted by the rectifying section 1401 into a DC power. Next, the inverter section 1402 turns those switching elements U, V, W, X, Y and Z ON and OFF so that the current flowing through the load in each phase has its directions changed alternately. In this case, semiconductor devices such as MOSFETs or IGBTs are generally used as the switching elements U, V, W, X, Y and Z. The timings to turn those switching elements ON and OFF are controlled by pulse width modulation (PWM) method.

FIGS. 15A and 15B illustrate the configuration and operation of the switching control section 1403. As shown in FIG. 15A, the switching control section 1403 includes a PWM control section 1503 that receives a reference sinusoidal wave 1501, of which the frequency is set to be as high as that of the low-frequency power to output, and a triangular wave 1502, of which the frequency has been predefined to be higher than that frequency. The PWM control section 1503 supplies pulses, which have been generated based on the reference sinusoidal wave 1501 and the triangular wave 1502, to the respective gates of predetermined switching elements.

As an example, it will be described how the switching control section 1403 operates when outputting power to between u and v phases. FIG. 15B shows exemplary switching timings for the PWM control section 1503. First of all, the PWM control section 1503 compares the respective input values of the reference sinusoidal wave 1501 and the triangular wave 1502 to each other. If "reference sinusoidal wave≥0" and "reference sinusoidal wave≥ triangular wave", the PWM control section 1503 turns switching elements U and Y ON. On the other hand, if "reference sinusoidal wave≥0" and "reference sinusoidal wave<triangular wave", the PWM control section 1503 turns switching elements U and Y OFF. Meanwhile, if "reference sinusoidal wave<0" and "reference sinusoidal wave≥triangular wave", the PWM control section 1503 turns switching elements V and X ON. On the other hand, if "reference sinusoidal wave<0" and "reference sinusoidal wave<triangular wave", the PWM control section 1503 turns switching elements V and X OFF. By performing these operations, the PWM control section 1503 outputs pulses, of which the widths vary according to the amplitude of the reference sinusoidal wave.

The DC power that has been supplied to the inverter section 1402 is converted as a result of these switching operations into a train of pulses, of which the widths are the same as those of the pulses shown in FIG. 15B. And such a train of pulses is output. By passing through the low-pass filter section 104, the output pulse train is converted into a sinusoidal wave with the intended frequency as final output. In the example described above, a configuration for obtaining a sinusoidal wave output has been described. However, even if the given reference sinusoidal wave is converted to have an arbitrary frequency and an arbitrary waveform, the incoming high-frequency AC power can also be converted into AC power with the arbitrary frequency and the arbitrary waveform.

In the AC converter with such a configuration, however, the high-frequency AC power is once converted into a DC power by the rectifying section 1401, thus inevitably causing some power loss. In addition, since the inverter section 1402 turns the switches ON and OFF with the DC voltage applied, switching loss is also caused inevitably. On top of that, since a capacitor is needed for rectifying purposes, the cost and durability problems should arise.

It is therefore an object of the present invention to provide an AC converter that can minimize such a decrease in conversion efficiency when an AC power with a relatively high frequency, which has been supplied from a wireless power transmission system, for example, is converted into an AC power with a relatively low frequency.

SUMMARY OF THE INVENTION

An AC converter according to the present invention is designed to convert a single-phase input AC voltage with a frequency f0 into a three-phase output AC voltage with a frequency f1 (where f1 is lower than f0). The converter includes: a switching section, which converts the input AC voltage in response to a control signal and which outputs the converted voltage to a phase that has been selected in accordance with the control signal; a filter section, which filters out high frequency components from the converted voltage, thereby converting the converted voltage into the output AC voltage; and a switching control section, which performs a pulse density modulation on a phase-by-phase basis and in response to a reference signal with the frequency f1, which is associated with the output AC voltage of each said phase, synchronously with a zero cross of the input AC voltage, thereby generating the control signal according a pulse generation status by the pulse density modulation and the polarity of the input AC voltage and sending out the control signal to the switching section.

Another AC converter according to the present invention is designed to convert a single-phase input AC voltage with a frequency f0 into a three-phase output AC voltage with a frequency f1 (where f1 is lower than f0). The converter includes: a converter section, which converts the input AC voltage into a DC voltage; a switching section, which converts the DC voltage in response to a control signal and which outputs the converted voltage to a phase that has been selected in accordance with the control signal; a filter section, which filters out high frequency components from the converted voltage, thereby converting the converted voltage into the output AC voltage; and a switching control section, which performs a pulse density modulation on a phase-by-phase basis and in response to a reference signal with the frequency f1, which is associated with the output AC voltage of each said phase, synchronously with a zero cross of the input AC voltage, thereby generating the control signal according a pulse generation status by the pulse density modulation and sending out the control signal to the switching section.

An AC converting method according to the present invention is designed to convert a single-phase input AC voltage with a frequency f0 into a three-phase output AC voltage with a frequency f1 (where f1 is lower than f0). The method includes the steps of: converting the input AC voltage in response to a control signal and outputting the converted voltage to a phase that has been selected in accordance with the control signal; filtering out high frequency components from the converted voltage, thereby converting the converted voltage into the output AC voltage; performing a pulse density modulation on a phase-by-phase basis and in response to a reference signal with the frequency f1, which is associated with the output AC voltage of each said phase, synchronously with a zero cross of the input AC voltage; and generating the control signal according a pulse generation status by the pulse density modulation and the polarity of the input AC voltage.

Another AC converting method according to the present invention is designed to convert a single-phase input AC voltage with a frequency f0 into a three-phase output AC voltage with a frequency f1 (where f1 is lower than f0). The method includes the steps of: converting the input AC voltage into a DC voltage; converting the DC voltage in response to a control signal and outputting the converted voltage to a phase that has been selected in accordance with the control signal; filtering out high frequency components from the converted voltage, thereby converting the converted voltage into the output AC voltage; performing a pulse density modulation on a phase-by-phase basis and in response to a reference signal with the frequency f1, which is associated with the output AC voltage of each said phase, synchronously with a zero cross of the input AC voltage; and generating the control signal according a pulse generation status by the pulse density modulation.

A storage medium according to the present invention stores a program that is designed to convert a single-phase input AC voltage with a frequency f0 into a three-phase output AC voltage with a frequency f1 (where f1 is lower than f0). The program is defined to make a computer perform the steps of: converting the input AC voltage in response to a control signal and outputting the converted voltage to a phase that has been selected in accordance with the control signal; filtering out high frequency components from the converted voltage, thereby converting the converted voltage into the output AC voltage; performing a pulse density modulation on a phase-by-phase basis and in response to a reference signal with the frequency f1, which is associated with the output AC voltage of each said phase, synchronously with a zero cross of the input AC voltage; and generating the control signal according a pulse generation status by the pulse density modulation and the polarity of the input AC voltage.

Another storage medium according to the present invention stores another program that is designed to convert a single-phase input AC voltage with a frequency f0 into a three-phase output AC voltage with a frequency f1 (where f1 is lower than f0). The program is defined to make a computer perform the steps of: converting the input AC voltage into a DC voltage; converting the DC voltage in response to a control signal and outputting the converted voltage to a phase that has been selected in accordance with the control signal; filtering out high frequency components from the converted voltage, thereby converting the converted voltage into the output AC voltage; performing a pulse density modulation on a phase-by-phase basis and in response to a reference signal with the frequency f1, which is associated with the output AC voltage of each said phase, synchronously with a zero cross of the input AC voltage; and generating the control signal according a pulse generation status by the pulse density modulation.

An AC converter as a preferred embodiment of the present invention performs a switching operation when the input high-frequency AC voltage has an input voltage of zero, and therefore, can get power conversion done with high efficiency.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1D is a flowchart showing another exemplary procedure in which the AC converter of the present invention operates.

FIG. 2 illustrates exemplary configurations for a switching element according to the first preferred embodiment of the present invention.

FIG. 4 is a table showing how the switches to turn ON change according to the input and output characteristics according to the first preferred embodiment of the present invention.

FIG. 8 is a table showing how the switches to turn ON change according to the input and output characteristics according to the second preferred embodiment of the present invention.

Figure 13:
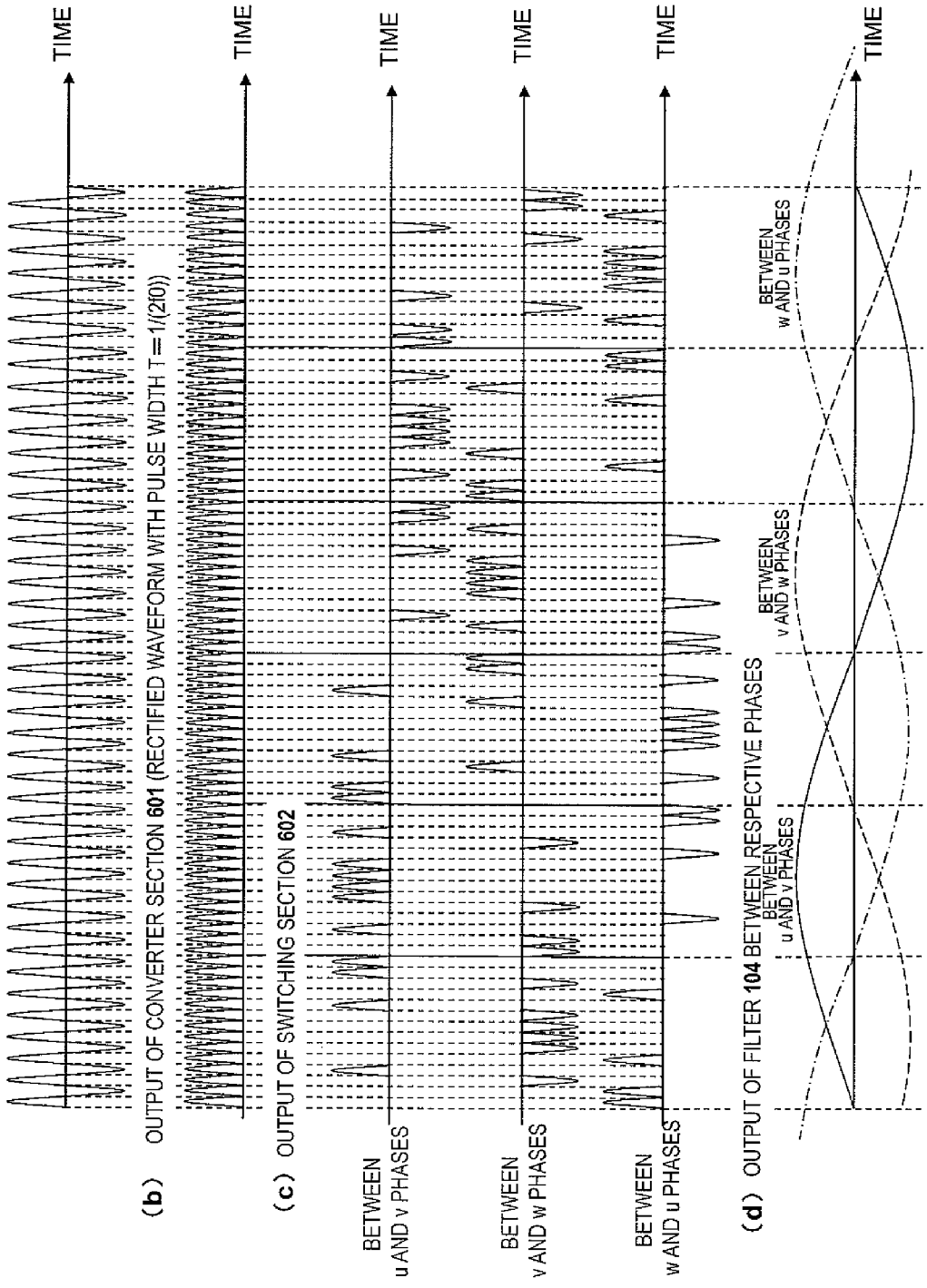

Portion (a) of FIG. 13 illustrates the waveform of an input AC voltage, portion (b) of FIG. 13 illustrates the output waveform of a converter section, portion (c) of FIG. 13 illustrates the output waveform of a switching section, and portion (d) of FIG. 13 illustrates the output waveforms of filters of respective phases.

Figure 14:
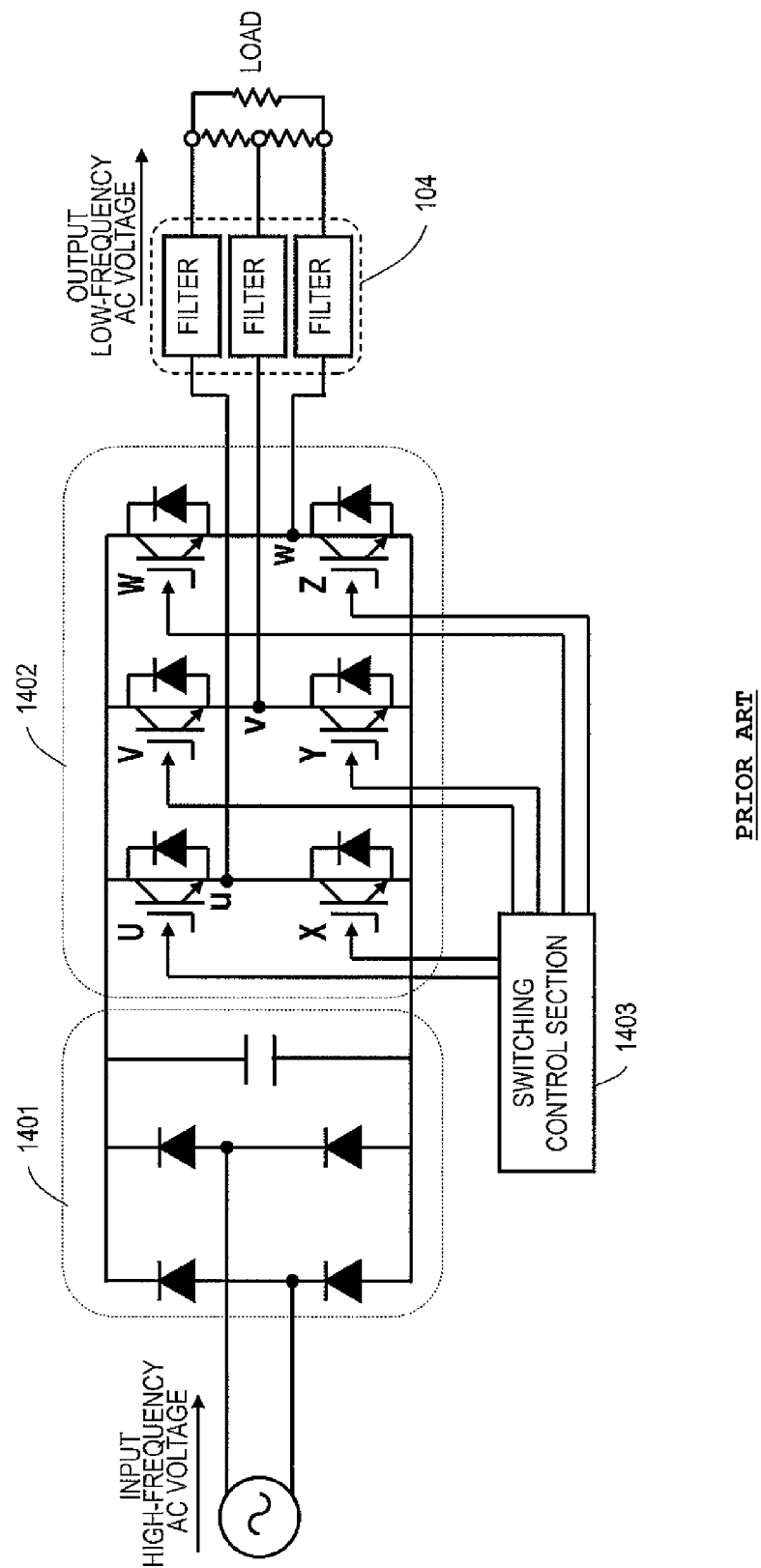

FIG. 14 illustrates a configuration for a conventional AC converter.

Figure 15A:
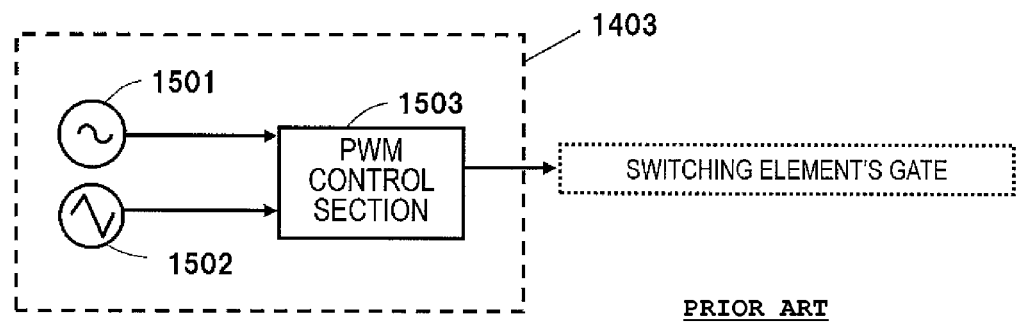
Figure 15B:
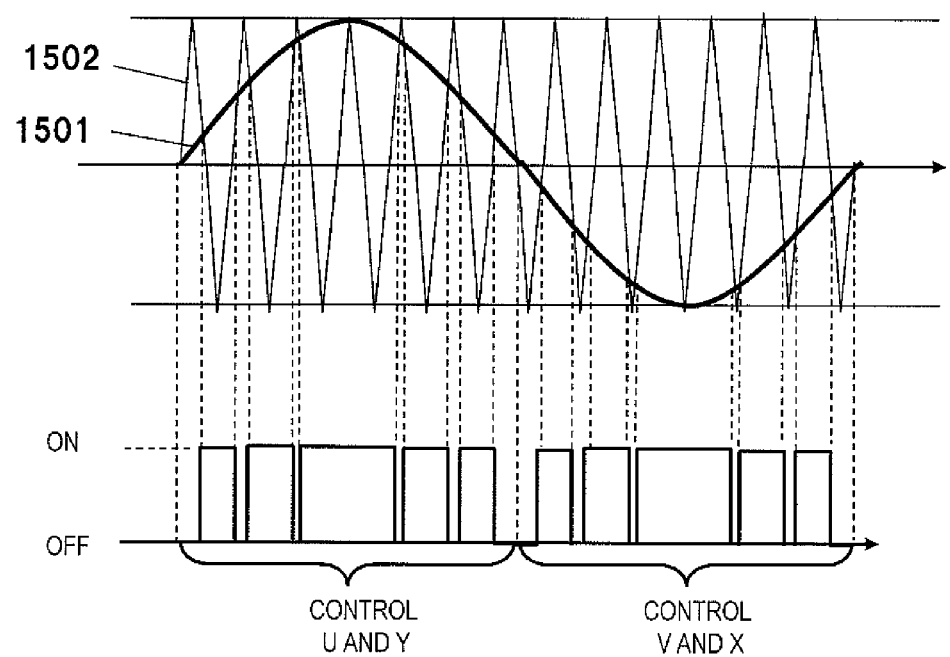

FIG. 15A illustrates a configuration for a switching control section for a conventional AC converter and FIG. 15B shows the timings of switching to be made by the switching control section of the conventional AC converter.

DETAILED DESCRIPTION OF PREFERRED EMBODIMENTS

Before preferred embodiments of the present invention are described, it will be described first generally how the present invention should work.

Figure 1A:
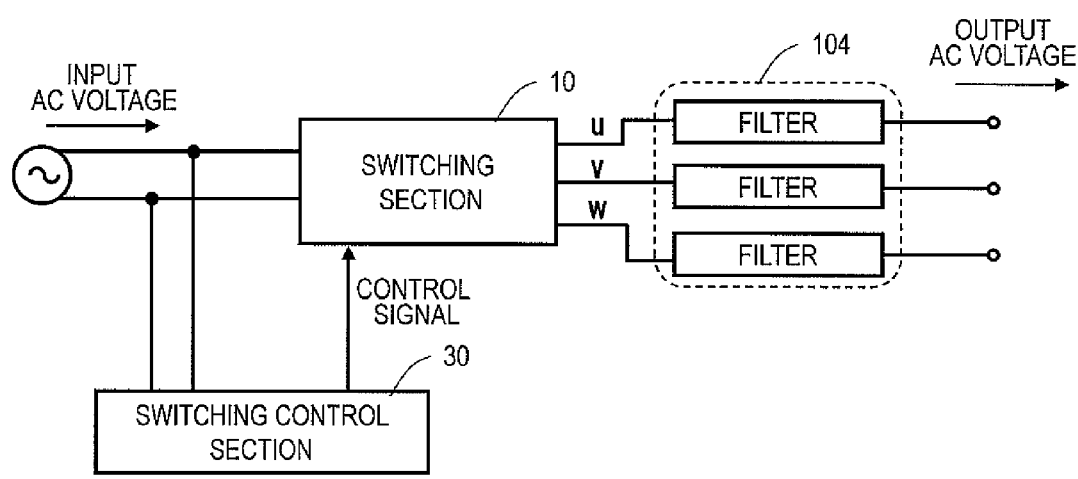
FIG. 1A illustrates an exemplary general configuration for an AC converter according to the present invention.

FIG. 1A illustrates an exemplary configuration for an AC converter according to the present invention. The AC converter shown in FIG. 1A is designed to convert a single-phase AC voltage with a frequency f0 (which will be sometimes referred to herein as an "input AC voltage") into a three-phase AC voltage with a frequency f1 that is lower than f0 (which will be sometimes referred to herein as an "output AC voltage"). This AC converter includes a switching section 10, a filter section 104 and a switching control section 30. The switching section 10 converts the input AC voltage in response to a control signal and outputs the converted voltage to respective phases (i.e., to between u and v phases, to between v and w phases, and to between w and u phases). The filter section 104 filters out high frequency components from the output of the switching section 10, thereby outputting the output AC voltage. And the switching control section 30 generates the control signal and supplies the signal to the switching section 10, thereby controlling the switching section 10.

Specifically, the switching control section 30 performs a pulse density modulation on a phase-by-phase basis and in response to a reference signal with the frequency f1, which is associated with the output AC voltage of each phase, synchronously with a zero cross of the input AC voltage. In this manner, the switching control section 30 generates the control signal according a pulse generation status by the pulse density modulation and the polarity of the input AC voltage and sends out the control signal to the switching section 10. And it is determined by this control signal to which phase the converted voltage needs to be output. This series of operations is performed every time the input AC voltage goes zero (i.e., every half period of the input AC voltage). In this description, "the pulse generation status" refers to whether or not a pulse has been generated in the first place with respect to each phase and also refers to the polarity of the pulse generated if the answer is YES.

The switching section 10 typically includes a number of switching elements and turns ON and OFF a particular switching element that has been selected in accordance with a control signal, thereby distributing the input voltage to three phases. In this manner, the intended three-phase AC voltage can be generated dynamically according to the respective polarities of the input and output AC voltages. It should be noted that even if "the input AC voltage goes zero", the input AC voltage may naturally be exactly equal to zero but may also be substantially equal to zero. In this description, if the difference of the input AC voltage from zero accounts for less than 10% of the amplitude of the input AC voltage, then the input AC voltage is supposed to be substantially equal to zero.

Figure 1B:
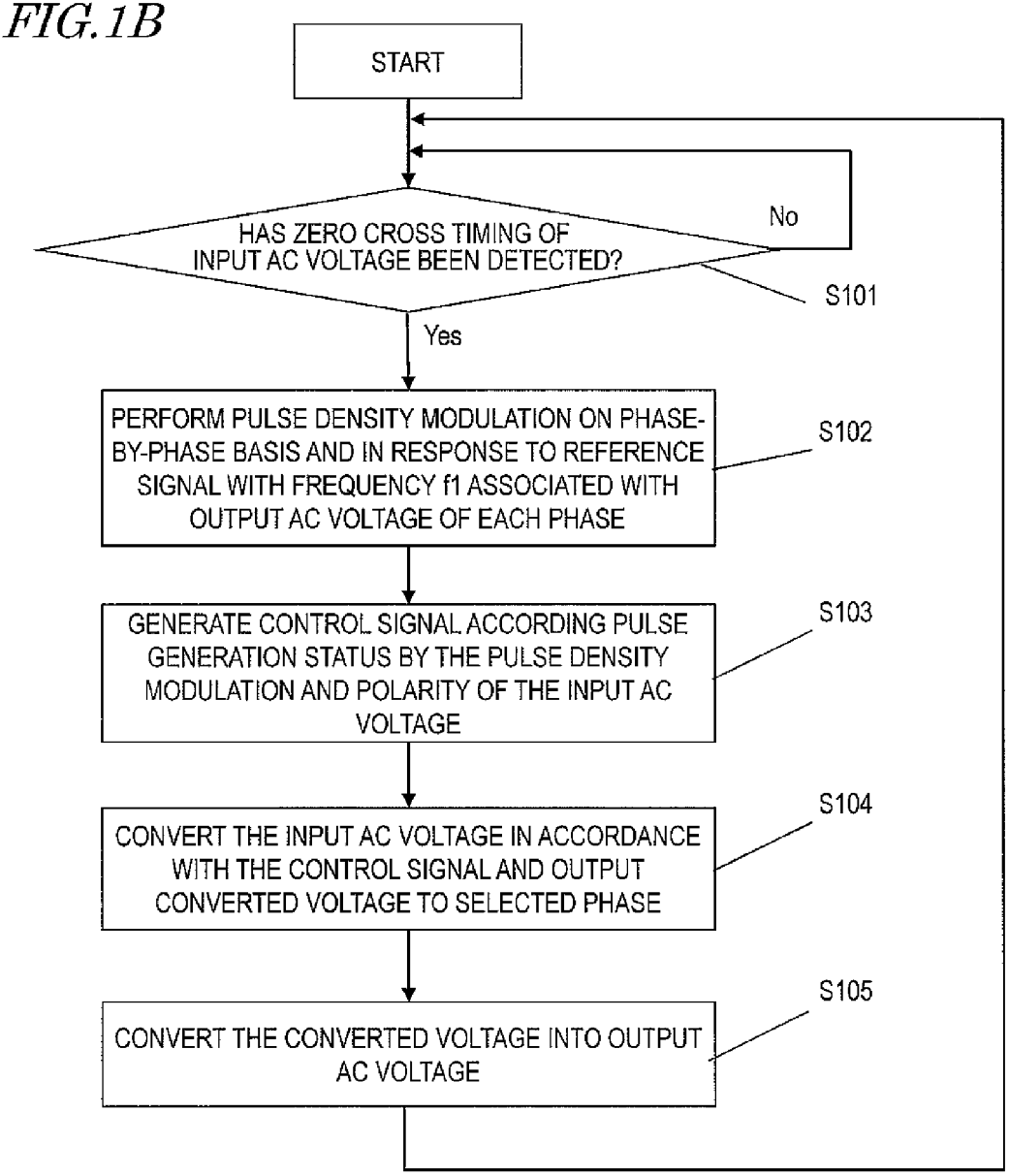
FIG. 1B is a flowchart showing an exemplary procedure in which the AC converter of the present invention operates.

FIG. 1B is a flowchart showing the procedure of the operation of the AC converter shown in FIG. 1A. First of all, in Step S101, it is determined whether or not a zero cross timing of the input AC voltage has been detected. If the answer is YES, the process advances to Step S102, in which a pulse density modulation is performed on a phase-by-phase basis and in response to a reference signal with the frequency f1, which is associated with the output AC voltage of each phase. Next, in Step S103, a control signal is generated according a pulse generation status by the pulse density modulation and the polarity of the input AC voltage. The processing step S101 may be performed by a detector (not shown), while the processing steps S102 and S103 are performed by the switching control section 30. Thereafter, in Step S104, the switching section 10 converts the input AC voltage in accordance with the control signal and outputs the converted voltage to the selected phase. Finally, in Step S105, the filter section 104 converts the converted voltage into an output AC voltage. By performing this series of processing steps a number of times every half period of the input AC voltage, the input AC voltage can be converted into an output AC voltage with a relatively low frequency.

In this example, the control signal is sent to the switching section 10 synchronously with a zero cross of the input AC voltage. That is why the switching operation is performed inside of the switching section 10 when the voltage is zero. Consequently, the power loss involved by the switching operation can be reduced. Furthermore, since the input AC voltage is converted into an output AC voltage without being converted into a DC voltage, the conversion can get done with high efficiency. It should be noted that the configurations and operations of the switching section 10 and the switching control section 30 will be described in further detail later about a first preferred embodiment of the present invention.

Figure 1C:
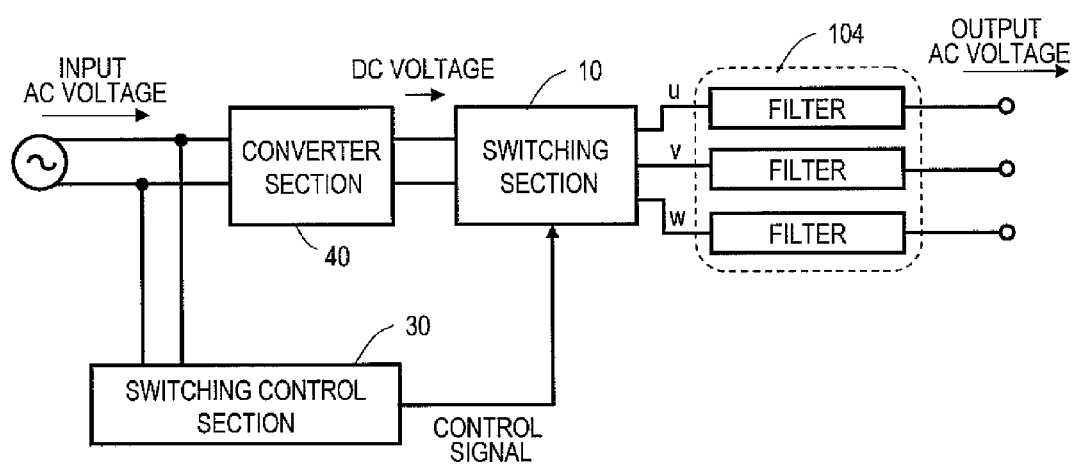
FIG. 1C illustrates another exemplary general configuration for an AC converter according to the present invention.

The AC converter does not have to have such a configuration but may also have any other configuration as well. FIG. 1C illustrates an alternative configuration for an AC converter according to the present invention. This AC converter is also designed to convert a single-phase input AC voltage with a frequency f0 into a three-phase output AC voltage with a frequency f1 that is lower than f0. This AC converter includes not only every component shown in FIG. 1A but also a converter section 40, which converts the input AC voltage into a DC voltage once and then supplies the DC voltage to the switching section 10.

In this example, the switching control section 30 also performs a pulse density modulation on a phase-by-phase basis and in response to a reference signal with the frequency f1, which is associated with the output AC voltage of each phase, synchronously with a zero cross of the input AC voltage. Then, the switching control section 30 generates the control signal according a pulse generation status by the pulse density modulation and sends out the control signal to the switching section 10. In this example, the converter section 40 once converts the input AC voltage into a DC voltage, and therefore, the voltage applied to the switching section 10 is always positive. That is why the switching control section 30 controls the switching section 10 according to only the pulse generation status.

FIG. 1D is a flowchart showing the procedure of the operation of the AC converter shown in FIG. 1C. According to this procedure, in Step S200, the converter section 40 converts the input Ac voltage into a DC voltage. Meanwhile, in Step S201, it is determined whether or not a zero cross timing of the input AC voltage has been detected. If the answer is YES, the process advances to Step S202, in which a pulse density modulation is performed on a phase-by-phase basis and in response to a reference signal with the frequency f1, which is associated with the output AC voltage of each phase. Next, in Step S203, a control signal is generated according a pulse generation status by the pulse density modulation. After Step S200 and S203, in Step S204, the switching section 10 converts the DC voltage supplied from the converter section 104 in accordance with the control signal and outputs the converted voltage to the selected phase. Finally, in Step S205, the filter section 104 converts the converted voltage into an output AC voltage. It should be noted that the processing step S200 and the processing steps S201 through 5203 may be performed in parallel with each other. By performing this series of processing steps a number of times every half period of the input AC voltage, the input AC voltage can be converted into an output AC voltage with a relatively low frequency.

In the example illustrated in FIG. 1C, the control signal is also sent to the switching section 10 synchronously with a zero cross of the input AC voltage. That is why the switching operation is performed inside of the switching section 10 when the voltage is zero. Consequently, the power loss involved by the switching operation can be reduced. It should be noted that the configurations and operations of the switching section 10 and the switching control section 30 will be described in further detail later about a second preferred embodiment of the present invention.

In the foregoing description, each component of the AC converter is illustrated as a block with its own unique function. However, the operation of this AC converter can also get done even by making a processor execute a computer program that defines the processing to be carried out by those functional blocks. The procedure of the processing of such a program is also just as shown in FIG. 1B or 1D.

Hereinafter, preferred embodiments of the present invention will be described with reference to the accompanying drawings. In the following description, any pair of components shown in multiple drawings and having substantially the same function will be identified by the same reference numeral.

(Embodiment 1)

Figure 1E:
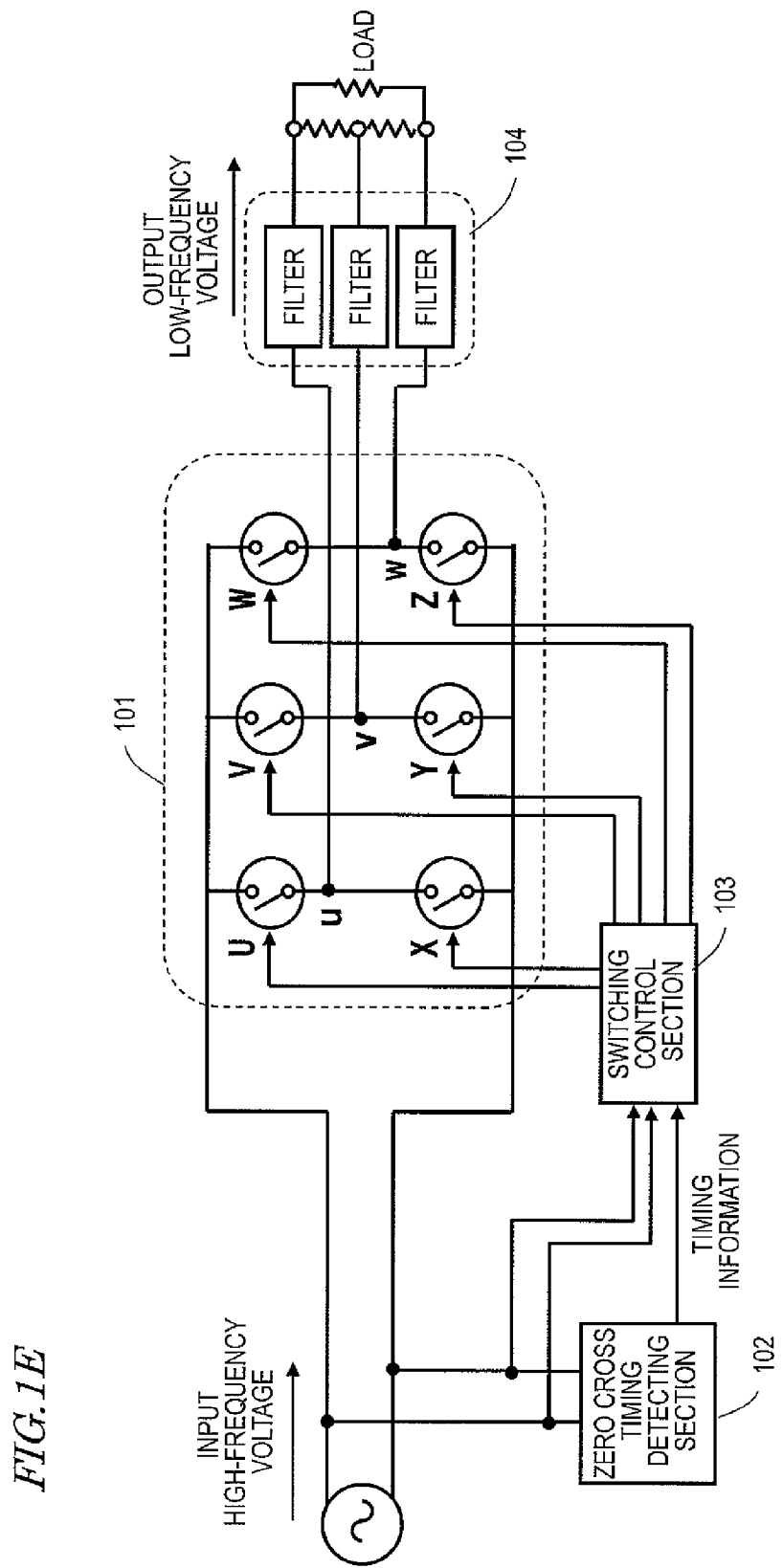
FIG. 1E is a block diagram illustrating a general configuration for an AC converter according to a first preferred embodiment of the present invention.

First of all, an AC converter as a first preferred embodiment of the present invention will be described. FIG. 1E is a block diagram illustrating a general configuration for an AC converter according to this preferred embodiment. The AC converter of this preferred embodiment is designed to convert a single-phase input AC voltage with a frequency f0 into a three-phase output AC voltage with a relatively low frequency f1. The AC converter includes a switching section 101, which supplies the input AC voltage to respective phases using multiple switching elements, a zero cross timing detecting section 102, which detects a timing when the input AC voltage goes zero (which will be referred to herein as "zero cross timing"), a switching control section 103, which controls the operations of the respective switching elements, and filters 104, which filter out the high frequency components of the output voltage of the switching section 101. A load is connected to follow the filters 104 and is supplied with an AC voltage with the frequency f1. In the illustrative example shown in FIG. 1E, a single-phase input, three-phase output configuration is illustrated, the frequency f0 may be set to be 100 kHz or more, and the frequency f1 may be set to be 50 Hz, which is as high as the frequency of the power supply system. Both the input AC voltage and the output AC voltage are supposed to be sinusoidal wave voltages.

A single-phase AC voltage with the frequency f0 is input to the switching section 101, which includes switching elements U, V, W, X, Y and Z that operate in accordance with a control signal supplied from the switching control section 103. By using these switching elements U, V, W, X, Y and Z, the switching section 101 selectively outputs the input AC voltage to the filters 104 that are connected to the respective phases of u, v and w. Among these switching elements, if the polarity of the input AC voltage with a relatively high frequency is positive, each of the switching elements U, V and W outputs a positive voltage to its associated phase. And these switching elements U, V and W will sometimes be referred to herein as "first type of switches". On the other hand, if the polarity of the input AC voltage with the relatively high frequency is negative, each of the switching elements X, Y, and Z outputs a positive voltage to its associated phase. And these switching elements X, Y and Z will sometimes be referred to herein as a "second type of switches".

FIG. 2 illustrates exemplary configurations for each of those switching elements. Each switching element may have a configuration in which MOSFETs or IGBTs, which are ordinary semiconductor switching elements, are connected in series or in parallel to diodes as shown in FIG. 2(a) or connected together in a diode bridge. Alternatively, each switching element may also be made up of bidirectional switching elements such as reverse-blocking IGBTs as shown in FIG. 2(b). In any case, a control signal is supplied from the switching control section 103 to the gate of each of these switching elements.

Figure 3A:
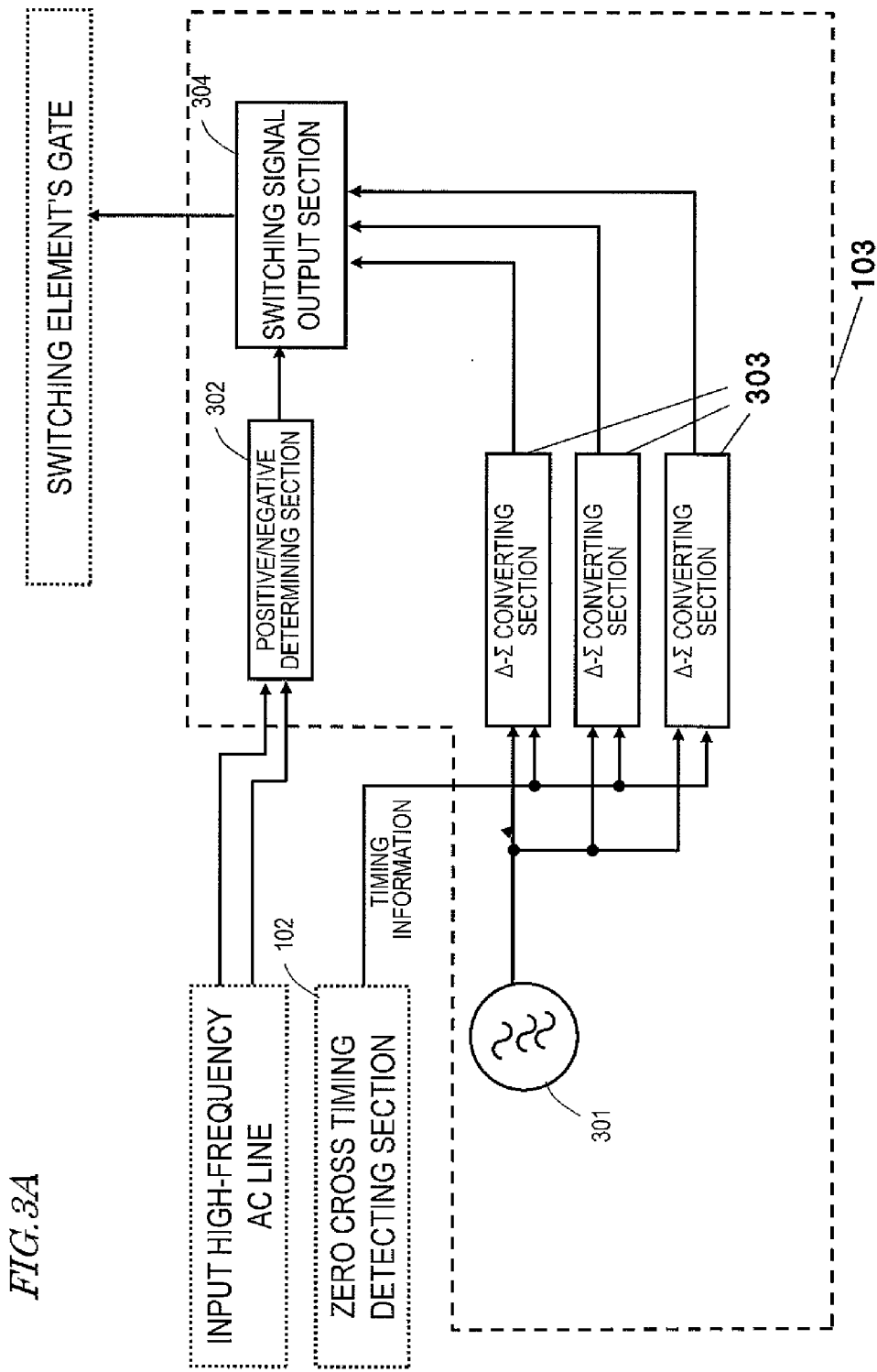
FIG. 3A illustrates a specific configuration for a switching control section according to the first preferred embodiment of the present invention.

Next, the configuration and operation of the switching control section 103 will be described in detail. FIG. 3A illustrates a specific configuration for the switching control section 103. The switching control section 103 includes a reference sinusoidal wave generating section 301, which generates a sinusoidal wave (as a reference signal) that has the same frequency as the output AC voltage of each phase (and which is equivalent to the reference signal generating section). The switching control section 103 also includes a positive/negative determining section 302, which determines the polarity of the input AC voltage to be either positive or negative. And the switching control section 103 further includes three Δ-Σ converting sections 303, which generate pulse trains associated with the respective phases by Δ-Σ modulation, and a switching signal output section 304, which outputs a control signal to the gate of each switching element. The Δ-Σ converting sections 303 are provided with timing information, indicating the timings when the voltage value of the input AC voltage goes zero, by the zero cross timing detecting section 102. Also, the positive/negative determining section 302 is arranged so as to receive the output of an input high-frequency AC line.

The reference sinusoidal wave generating section 301 generates three-phase sinusoidal waves, which have much lower power than the input AC power with a high frequency, which have three phases that are different from each other by 120 degrees, and which have a frequency of 50 Hz, and outputs those sinusoidal waves to the Δ-Σ converting sections 303 that are associated with the respective phases. In this case, the output of the reference sinusoidal wave generating section 301 is supposed to be a sinusoidal wave, of which the value goes sometimes positive and sometimes negative across zero. Each of the Δ-Σ converting sections 303 performs a Δ-Σ conversion in accordance with the supplied sinusoidal wave value as an instruction value. Then, in accordance with the timing information provided by the zero cross timing detecting section 102, the Δ-Σ converting sections 303 output pulses to the switching signal output section 304 synchronously with a zero cross of the voltage level of the input AC voltage.

Figure 3B:
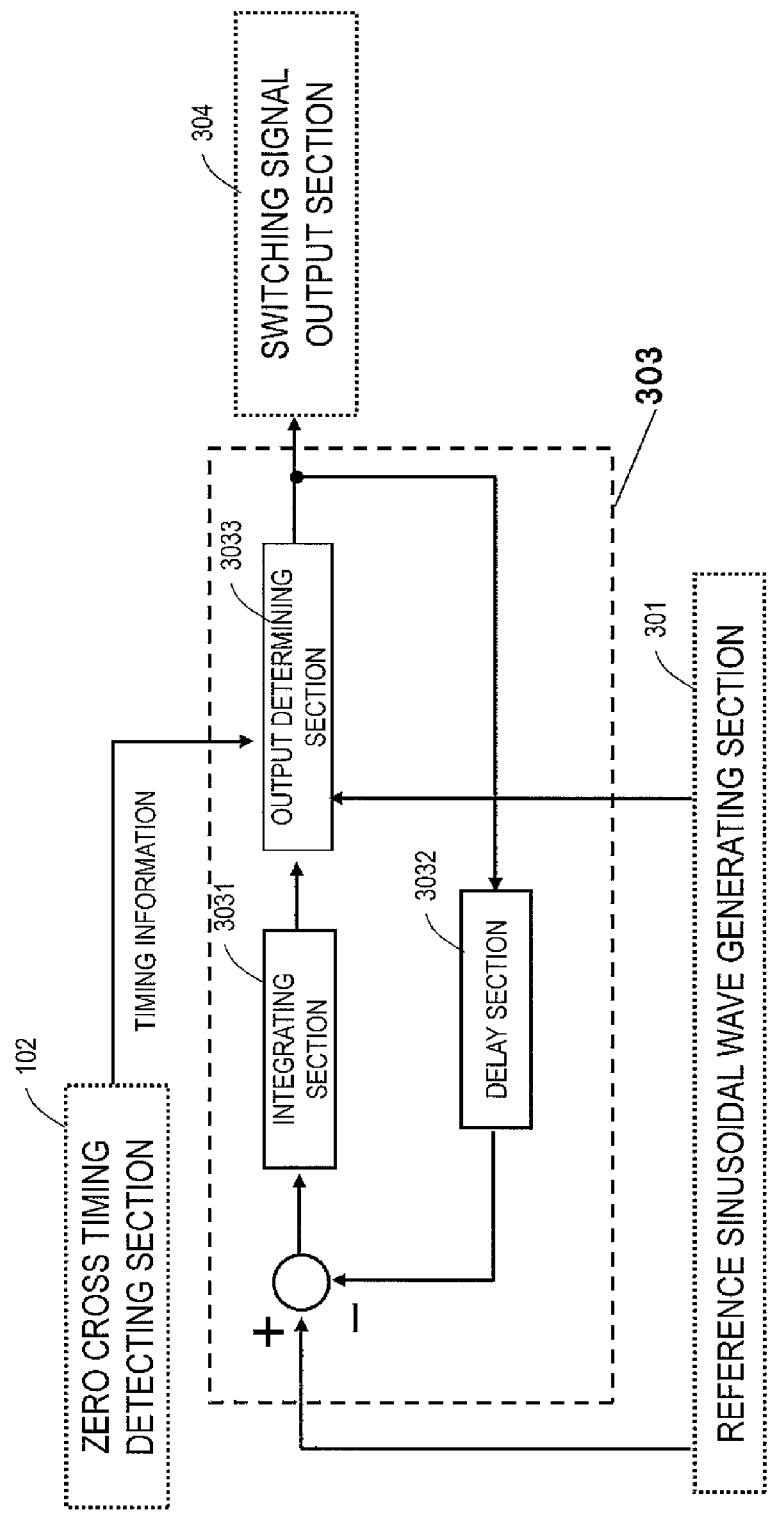
FIG. 3B illustrates a configuration for a $\Delta\text{-}\Sigma$ converting section according to the first preferred embodiment of the present invention.

FIG. 3B illustrates a configuration for a Δ-Σ converting section 303, which is associated with one phase. The Δ-Σ converting section 303 includes an integrating section 3031, a delay section 3032 and an output determining section 3033. As shown in FIG. 3B, the integrating section 3031 calculates the integral with time of the differences between the input values of the reference sinusoidal wave generating section 301 and the values supplied through the delay section 3032 and outputs the integral thus calculated to the output determining section 3033. In this case, the delay section 3032 delays the output of the input signal for a predetermined amount of time (e.g., for a half period of the input AC voltage). The output determining section 3033 has two predetermined threshold values that are positive and negative, respectively, and outputs a pulse signal in response to the timing information provided. In this case, if the value provided by the integrating section 3031 is greater than a predetermined positive threshold value, the output determining section 3033 outputs a positive pulse. On the other hand, if the value provided by the integrating section 3031 is smaller than a predetermined negative threshold value, the output determining section 3033 outputs a negative pulse. In this case, the waveform of the pulses output by the output determining section 3033, which represents a variation in density per unit time, becomes a sinusoidal wave with a frequency of 50 Hz just like the sinusoidal wave generated by the reference sinusoidal wave generating section 301. The positive and negative threshold values are determined for the output determining section 3033 based on the output value of the reference sinusoidal wave generating section 301 and the ratio of the frequency of the input high-frequency AC voltage to that of the output low-frequency AC voltage. In this manner, each Δ-Σ converting section 303 outputs a pulse signal that has a density variation at the same frequency as the frequency of the reference sinusoidal wave generating section 301. The pulse signal that has been output on a phase by phase basis is supplied to the switching signal output section 304 shown in FIG. 3A.

In the foregoing description, the output AC voltage is supposed to be a sinusoidal wave with a frequency of 50 Hz. However, the output AC voltage may also have any other waveform. If the output of the reference sinusoidal wave generating section 301 has an arbitrary waveform instead of the sinusoidal wave described above, an output AC voltage with that waveform can be obtained. Such a method for modulating the waveform into an arbitrary one with a variation in pulse density is called a "pulse density modulation (PDM)" method.

The positive/negative determining section 302 shown in FIG. 3A determines the current polarity of the input high-frequency AC voltage and provides the polarity information for the switching signal output section 304. Based on the pulse signals supplied from the Δ-Σ converting sections 303 and the polarity information provided by the positive/negative determining section 302, the switching signal output section 304 outputs a control signal to the respective switching elements of the switching section 101 to turn them ON and OFF.

FIG. 4 is a table of correspondence showing to which switching elements the switching signal output section 304 outputs a control signal with respect to various combinations of the polarity of the input AC voltage and the polarity of the output voltage between the respective phases. In FIG. 4, the input voltage polarity represents the polarity information provided by the positive/negative determining section 302, while the output voltage polarity indicates whether the pulses supplied from the Δ-Σ converting sections 303 are positive or negative. For example, if a positive voltage needs to be applied between the u and v phases when the input voltage polarity is positive, the switching signal output section 304 turns the switching elements U and Y ON at the same time. On the other hand, if a positive voltage needs to be applied between the u and v phases when the input voltage polarity is negative, the switching signal output section 304 turns the switching elements V and X ON at the same time. By turning the switching elements U, V, W, X, Y and Z ON and OFF in accordance with this table of correspondence, the switching signal output section 304 distributes the pulses to be applied so that if a voltage corresponding to a half wavelength of the input AC voltage is supposed to be one pulse, a variation in pulse density per unit time between the respective phases (i.e., uv, vw and wu) becomes a three-phase sinusoidal wave. To avoid a short-circuit on the output end, the switching control section 103 performs an exclusive control so as to prevent the switching elements U and X, V and Y, or W and Z from turning ON simultaneously.

The table of correspondence shown in FIG. 4 may be stored as a table in a memory (not shown). And by having the switching control section 103 make reference to that table, the control described above is realized. Alternatively, the switching control section 103 may also have its circuit configuration designed in advance so as to operate in accordance with the table of correspondence.

By getting such a control done by the switching control section 103, the switching section 101 outputs a train of pulses, each of which is a voltage corresponding to a half wavelength of the input AC voltage. The pulse train thus output is supplied to the filters 104, which are arranged with respect to respective phases.

Each of the filters 104 removes high-frequency components from the output pulse train supplied from the switching section 101 and provides an AC voltage with a low frequency of 50 Hz as a final output. Each filter 104 is a low-pass filter consisting of an inductor and a capacitor. Normally, supposing the input AC voltage has a frequency f0 and the output is provided by n phases, harmonic noise can be removed effectively by setting the cutoff frequency of the filter to be f0/(10× n). For example, if f0 is 100 kHz and if the output needs to be supplied to three phases, the cutoff frequency may be set to be approximately 33.3 kHz.

Figure 5:
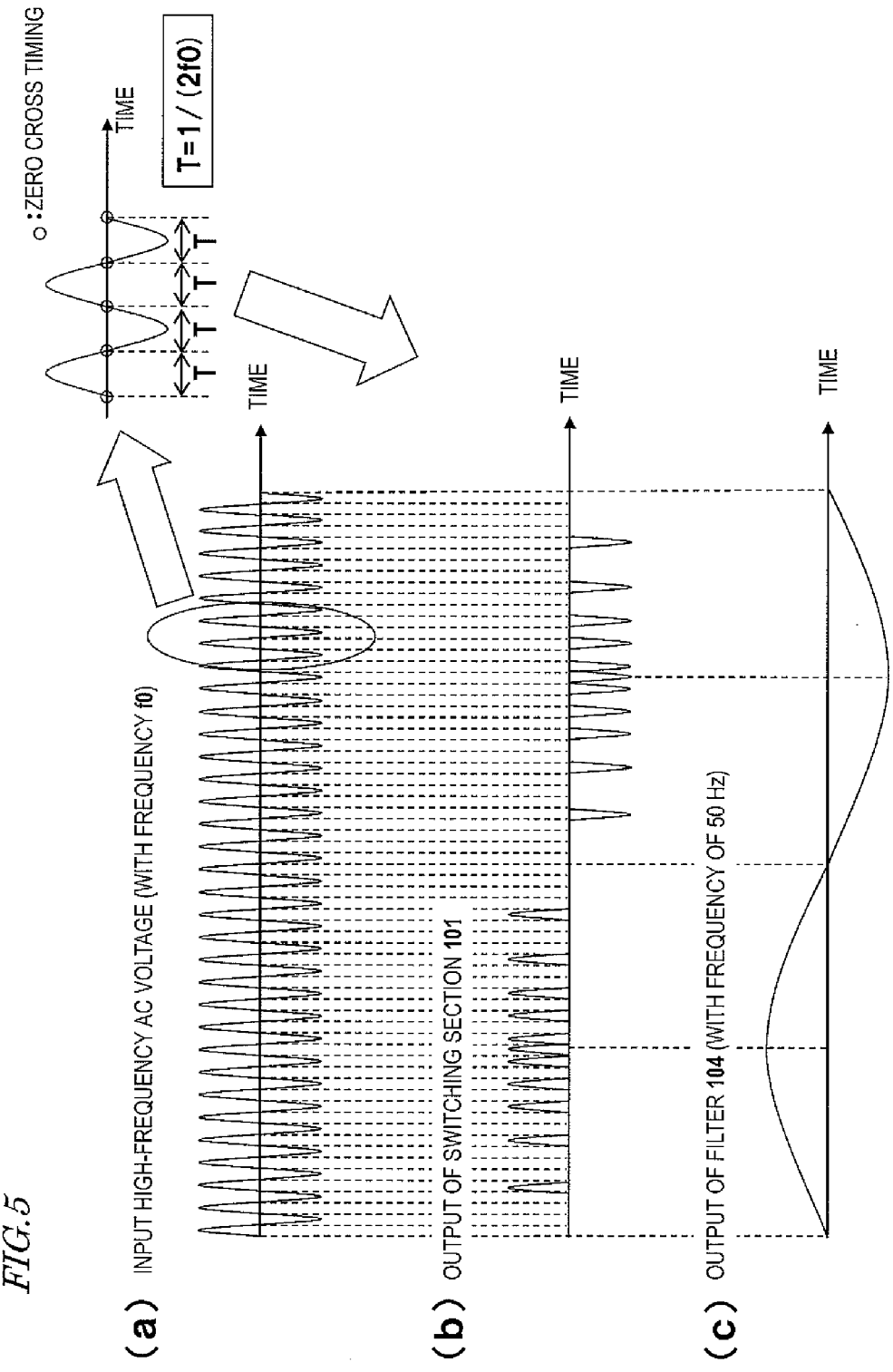
FIG. 5 shows the waveforms of respective voltages to apply according to the first preferred embodiment of the present invention, wherein portion (a) illustrates the waveform of an input AC voltage, portion (b) illustrates the output waveform of a switching section and portion (c) illustrates the output waveform of a filter.

FIG. 5 shows a relation between the input high-frequency AC voltage, the output of the switching section 101, and the output waveform of a filter 104 associated with one phase. Portion (a) of FIG. 5 illustrates the waveform of an input high-frequency AC voltage with frequency f0. Portion (b) of FIG. 5 illustrates an example of time variation of the output of the switching section 101. Since the switches are controlled to be turned ON and OFF at zero cross timings of input AC voltage synchronously with the output from Δ-Σ converting section, pulses whose density varies as sinusoidal wave are output. Portion (c) of FIG. 5 illustrates an example of time variation of the output of a filter 104. Since the density of pulses output from the switching section 101 varies as sinusoidal wave, AC voltage with frequency of 50 Hz is output from the filter 104. As shown in FIG. 5, the input high-frequency AC voltage can be directly converted into an AC voltage with a low frequency of 50 Hz even without being converted into a DC voltage. As a result, power conversion can get done with high efficiency.

(Embodiment 2)

Hereinafter, an AC converter as a second preferred embodiment of the present invention will be described.

Figure 6:
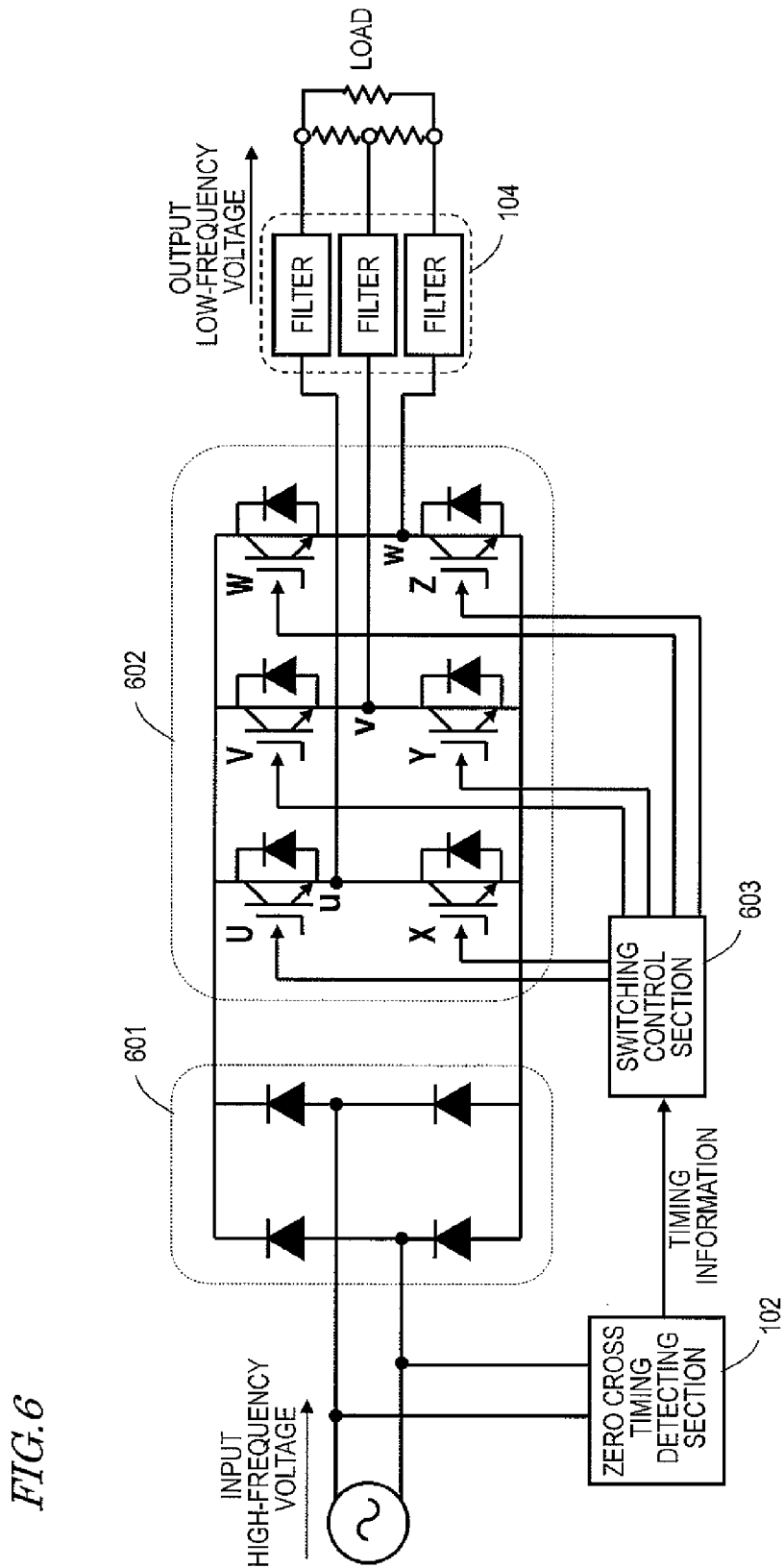
FIG. 6 is a block diagram illustrating a configuration for an AC converter according to a second preferred embodiment of the present invention.

FIG. 6 is a block diagram illustrating a general configuration for an AC converter according to this preferred embodiment. The AC converter of this preferred embodiment includes a converter section 601 with a rectifying function, which is arranged before the switching section 602 in order to convert the input AC voltage into a DC voltage once, which is a major difference from the AC converter of the first preferred embodiment described above. Thus, the following description of this second preferred embodiment will be focused on such a difference from the first preferred embodiment, and their common features will not be described all over again to avoid redundancies.

The AC converter of this preferred embodiment includes the converter section 601 that converts an AC voltage into a DC voltage, a switching section 602, which converts the input DC voltage into an AC voltage and supplies the AC voltage to respective phases, a zero cross timing detecting section 102, which detects a timing when the input AC voltage goes zero, a switching control section 103, which controls the operations of the respective switching elements, and filters 104, which filter out the high frequency components of the output voltage of the switching section 101. A load is connected to follow the filters 104 and is supplied with an AC voltage with the frequency f1 as in the first preferred embodiment described above. The frequency f0 may be set to be 100 kHz or more, and the frequency f1 may be set to be 50 Hz, which is as high as the frequency of the power supply system. Both the input AC voltage and the output AC voltage are supposed to be sinusoidal wave voltages.

The converter section 601 is implemented as a diode bridge and rectifies the single-phase input AC voltage with a frequency f0, thereby converting the AC voltage into a train of positive pulses with a frequency 2f0, of which one pulse is a voltage corresponding to a half wavelength of the AC voltage. The switching section 602 includes switching elements U, V, W, X, Y and Z that operate in accordance with a control signal supplied from the switching control section 603. By turning these switching elements U, V, W, X, Y and Z ON and OFF, the switching section 602 selectively outputs the input pulse train to the filters 104 that are connected to the respective phases of u, v and w. In this case, each switching element may be implemented as an MOSFET or an IGBT, which is a normal semiconductor switching element. As a control signal for each switching element, the output of the switching control section 603 is applied to the gate of the switching element.

Figure 7:
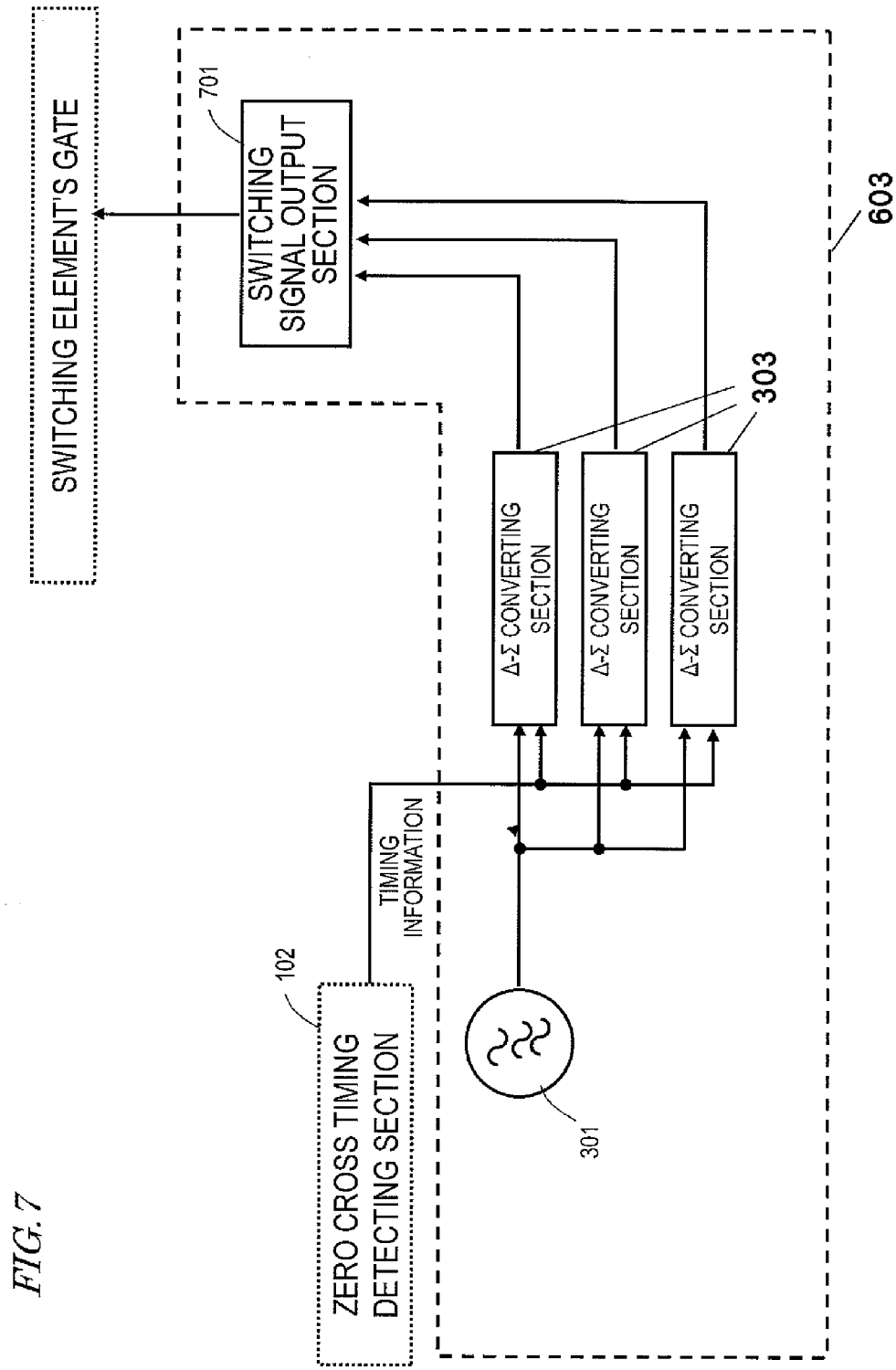
FIG. 7 illustrates a specific configuration for a switching control section according to the second preferred embodiment of the present invention.

Next, the configuration and operation of the switching control section 603 will be described in detail. FIG. 7 illustrates a specific configuration for the switching control section 603. The switching control section 603 includes a reference sinusoidal wave generating section 301, three Δ-Σ converting sections 303, and a switching signal output section 701. The zero cross timing detecting section 102 detects timings when the voltage value of the input AC voltage goes zero and notifies the converting sections 303 of the information detected as timing information.

The reference sinusoidal wave generating section 301 generates three-phase sinusoidal waves, which have much lower power than the input AC power with a high frequency, which have three phases that are different from each other by 120 degrees, and which have a frequency of 50 Hz, and outputs those sinusoidal waves to the Δ-Σ converting sections 303 that are associated with the respective phases. In this case, each of the Δ-Σ converting sections 303 is provided for its associated phase and performs a Δ-Σ conversion in accordance with the supplied sinusoidal wave value as an instruction value. Then, in accordance with the timing information provided, the Δ-Σ converting sections 303 output pulses to the switching signal output section 701 synchronously with a zero cross of the voltage level of the input AC voltage. In this case, the waveform of the output pulses, which represents a variation in density per unit time, becomes a sinusoidal wave with a frequency of 50 Hz just like the sinusoidal wave generated by the reference sinusoidal wave generating section 301. Based on the pulse signals supplied from the Δ-Σ converting sections 303, the switching signal output section 701 outputs a control signal to the respective switching elements of the switching section 602 to turn them ON and OFF.

FIG. 8 is a table of correspondence showing to which switching elements the switching signal output section 701 outputs a control signal with respect to the output voltage polarities of the Δ-Σ converting sections 303 according to this preferred embodiment. For example, if a positive voltage needs to be applied between the u and v phases, the switching signal output section 304 turns the switching elements U and Y ON at the same time. On the other hand, if a negative voltage needs to be applied between the u and v phases, the switching signal output section 304 turns the switching elements V and X ON at the same time. To avoid a short-circuit on the output end, the switching control section 701 performs an exclusive control so as to prevent the switching elements U and X, V and Y, or W and Z from turning ON simultaneously. In this manner, the switching control section 603 performs the Δ-Σ conversion on the pulse train supplied from the converter section 601, thereby performing a PDM modulation.

Figure 9:
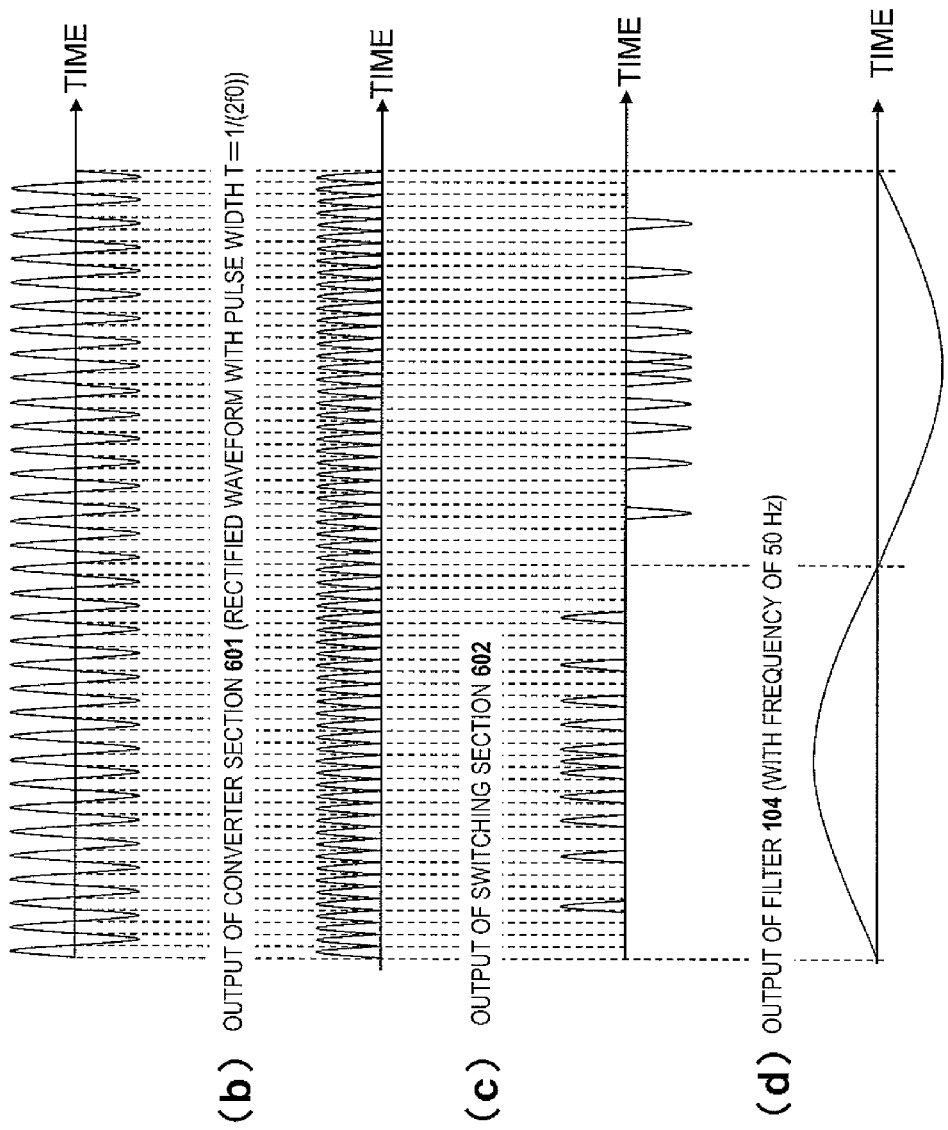
FIG. 9 shows the waveforms of respective voltages to apply according to the second preferred embodiment of the present invention, wherein portion (a) illustrates the waveform of an input AC voltage, portion (b) illustrates the output waveform of a converter section, portion (c) illustrates the output waveform of a switching section, and portion (d) illustrates the output waveform of a filter.

Each of the filters 104 removes high-frequency components from the output pulse train supplied from the switching section 101 and provides an AC voltage with a low frequency of 50 Hz as a final output. FIG. 9 shows a relation between the waveform of the input AC voltage, the output waveform of the converter section 601, the output waveform of the switching section 602, and the output waveform of a filter 104 associated with one phase. As shown in FIG. 9, the input high-frequency AC voltage is converted by the converter section 601 into a positive half-wave train, which is then converted by the switching section 602 into a PDM-modulated half-wave train. Eventually, the PDM-modulated half-wave train is converted into a low-frequency AC voltage by being subjected to low-pass filtering by the filters 104.

As described above, according to this preferred embodiment, switching is done when the input high-frequency AC voltage is zero, and therefore, the input high-frequency AC voltage can be converted into an AC voltage with a low frequency of 50 Hz efficiently. In the preferred embodiment described above, the zero cross timing detecting section 102 is supposed to detect a time when the input high-frequency AC voltage goes zero. Alternatively, the zero cross timing detecting section 102 may also be designed to detect a time when the output voltage of the converter section 601 goes zero.

(Embodiment 3)

Hereinafter, an AC converter as a third preferred embodiment of the present invention will be described. The AC converter of this preferred embodiment has a switching control section that has a different configuration, and operates differently, from the counterparts of the first and second preferred embodiments described above. But other than that, the AC converter of this preferred embodiment is the same as the first or second preferred embodiment described above. Thus, the following description of this third preferred embodiment will be focused on those differences from the basic configuration of the second preferred embodiment described above, and their common features will not be described all over again to avoid redundancies.

Figure 10:
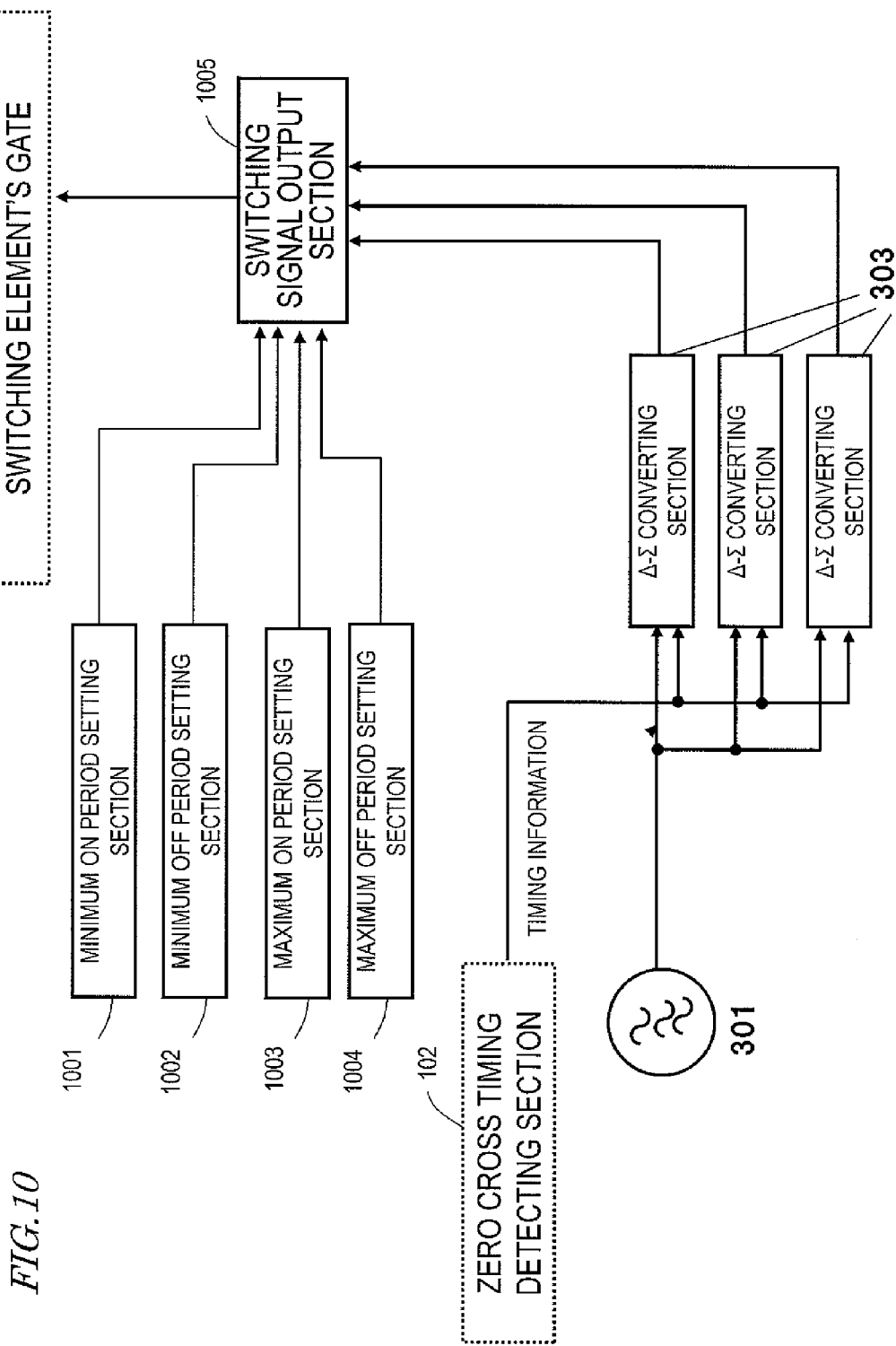
FIG. 10 illustrates a specific configuration for a switching control section according to a third preferred embodiment of the present invention.

FIG. 10 illustrates a general configuration for a switching control section for an AC converter according to this third preferred embodiment of the present invention. The switching control section 103 of this preferred embodiment further includes a minimum ON period setting section 1001, a minimum OFF period setting section 1002, a maximum ON period setting section 1003, and a maximum OFF period setting section 1004.

The minimum ON period setting section 1001 provides a minimum period of time, for which each switching element can continue to be in ON state, as a piece of switching time information for a switching signal output section 1005. In this case, since each switching element turns ON and OFF at a zero cross point of the input high-frequency AC voltage, that minimum period of time is set to be an integral number of times as long as a half of one period (1/f0) of the input high-frequency AC voltage. That minimum period of time may be either determined in advance or adjusted by the user him- or herself depending on the output status of this AC converter. In the same way, the minimum OFF period setting section 1002 provides a minimum period of time, for which each switching element can continue to be in OFF state, as another piece of switching time information for the switching signal output section 1005. The maximum ON period setting section 1003 provides a maximum period of time, for which each switching element can continue to be in ON state, as still another piece of switching time information for the switching signal output section 1005. And the maximum OFF period setting section 1004 provides a maximum period of time, for which each switching element can continue to be in OFF state, as yet another piece of switching time information for the switching signal output section 1005.

Based on the minimum and maximum ON/OFF periods that have been set as described above for the respective switching elements and the outputs of the Δ-Σ converting sections 303, the switching signal output section 1005 outputs a control signal to the respective switching elements to turn them ON and OFF selectively.

Figure 11:
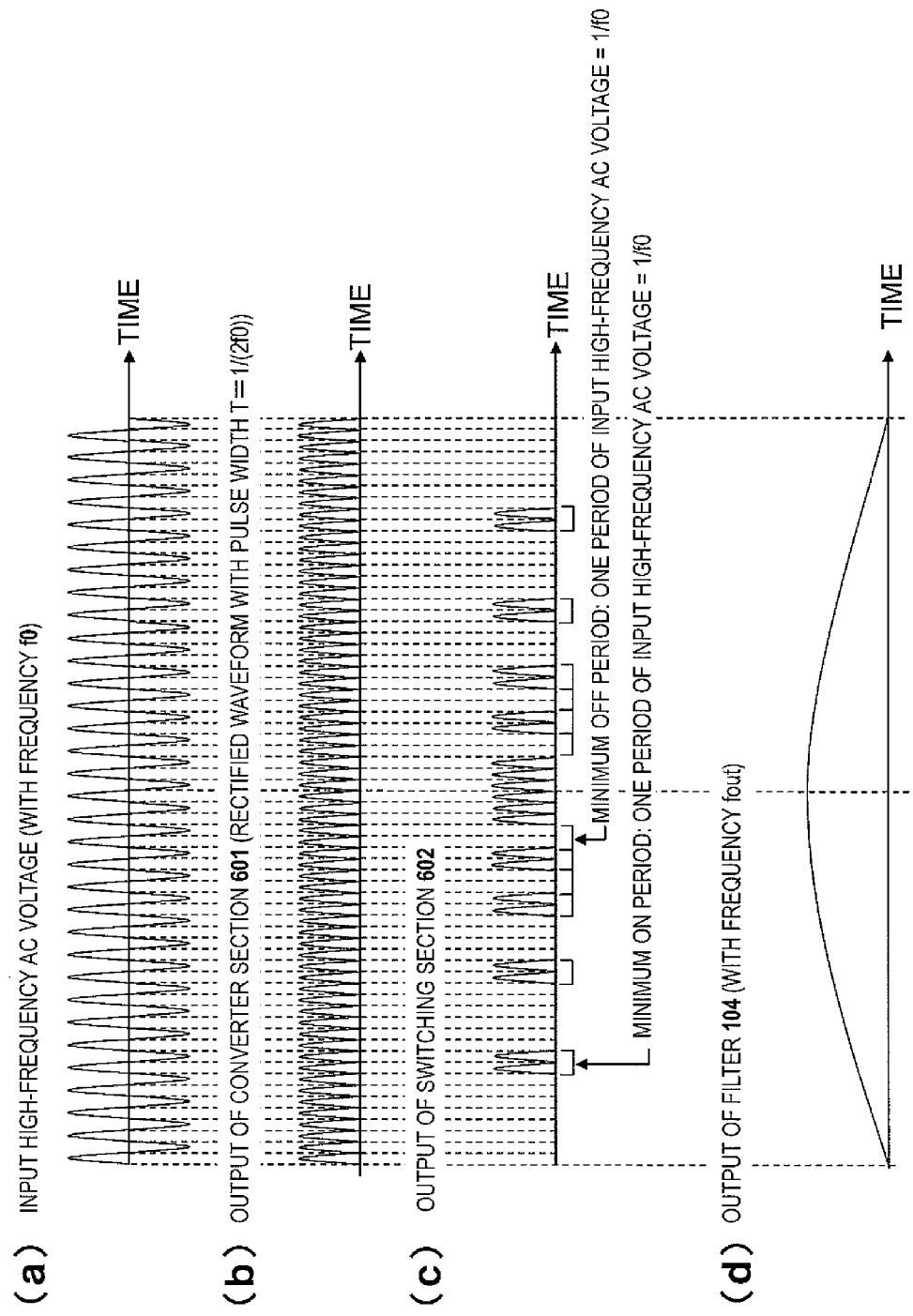
FIG. 11 shows the waveforms of respective voltages to apply according to the third preferred embodiment of the present invention, wherein portion (a) illustrates the waveform of an input AC voltage, portion (b) illustrates the output waveform of a converter section, portion (c) illustrates the output waveform of a switching section, and portion (d) illustrates the output waveform of a filter.

FIG. 11 shows the relation between the input high-frequency AC voltage, the output of the converter section 601, the output of the switching section 602 and the output waveform of the filter 104 associated with one phase. In FIG. 11, f0 (Hz) denotes the frequency of the input high-frequency AC voltage applied to the converter section 601, fout (Hz) denotes the frequency of the output low-frequency AC voltage, and the minimum ON period and the minimum OFF period are both supposed to be 1/f0 seconds (which corresponds to one period of the input high-frequency AC voltage). In this example, f0=33×fout is supposed to be satisfied. As shown in portion (c) of FIG. 11, by setting the minimum ON period and the minimum OFF period, the ON and OFF states are controlled by using one period of the input high-frequency AC voltage (i.e., two half-wave periods of the output of the converter section 601) as a minimum time unit. That is to say, the switching signal output section 1005 does not totally follow the output pulses of the respective Δ-Σ converting sections 303. But once a switching element has been turned ON or OFF, the switching signal output section 1005 maintains that turned-ON or turn-OFF state for a predetermined minimum period of time. Nevertheless, the switching signal output section 1005 controls the respective switching elements so that the final output becomes as close to the sinusoidal wave, which represents a variation in the density of the output pulse of each Δ-Σ converting section 303, as possible. By performing such a control, the number of times of switching required can be reduced compared to a situation where switching is performed using one half-wave period of the output of the converter section 601 as a minimum time unit. As a result, the power needed for switching drive and power loss involved with switching can be both cut down, and an output low-frequency AC voltage can be obtained efficiently. The minimum ON period and the minimum OFF period are supposed to have the same length in this example but may have mutually different lengths as well.

In this case, the smaller the number of times of switching required, the smaller the power loss. That is why the longer the minimum ON period and the minimum OFF period, the more significantly the loss can be cut down. However, if the minimum ON period and the minimum OFF period are extended, then the effects produced would eventually be as if the number of quantization of the PDM modulation carried out by the Δ-Σ converting sections 303 decreased. That is to say, the degree of smoothness of the variation in the density of the output half-wave of the switching section 602 would decrease, thus possibly causing a distortion in the waveform of the final output low-frequency AC voltage.

Thus, according to this preferred embodiment, to avoid causing such a distortion in the waveform of the final output low-frequency AC voltage, the maximum ON period and the maximum OFF period are further set so that the ON and OFF states can continue for only a preset period of time. By adopting such a configuration, the loss involved with switching can be cut down without causing such a waveform distortion in the final output low-frequency AC voltage. In the preferred embodiment described above, the minimum ON period setting section 1001, the minimum OFF period setting section 1002, the maximum ON period setting section 1003 and the maximum OFF period setting section 1004 are all provided. However, not everything but only some of them may be provided as well.

(Embodiment 4)

Hereinafter, an AC converter as a fourth preferred embodiment of the present invention will be described. The AC converter of this preferred embodiment has a switching control section that has a different configuration, and operates differently, from the counterparts of the first and second preferred embodiments described above. But other than that, the AC converter of this preferred embodiment is the same as the first or second preferred embodiment described above. Thus, the following description of this fourth preferred embodiment will be focused on those differences from the basic configuration of the second preferred embodiment described above, and their common features will not be described all over again to avoid redundancies.

Figure 12:
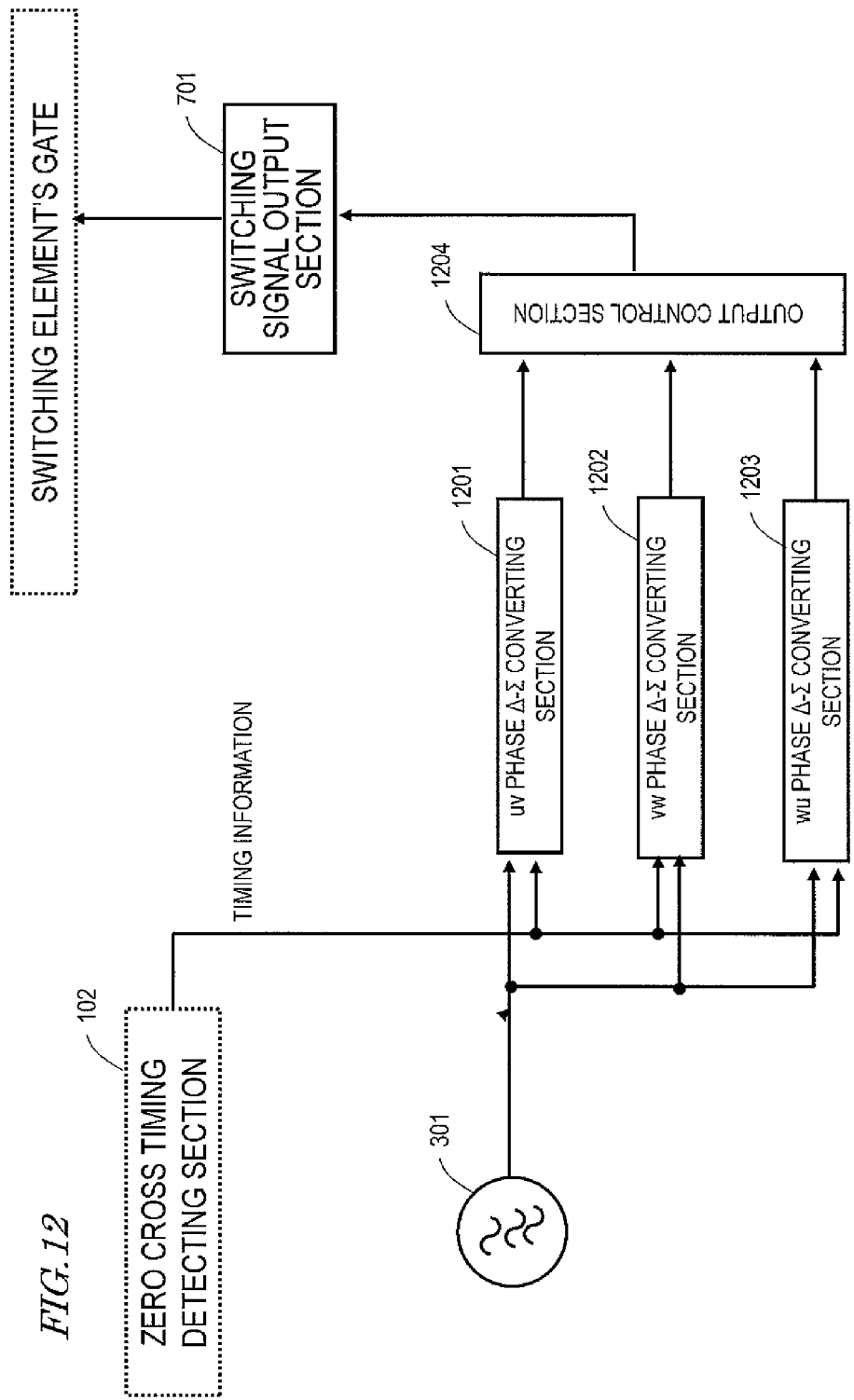
FIG. 12 illustrates a specific configuration for a switching control section according to a fourth preferred embodiment of the present invention.

FIG. 12 illustrates a configuration for the switching control section of an AC converter according to this fourth preferred embodiment of the present invention. In the switching control section of this preferred embodiment, an output control section 1204 is arranged after three Δ-Σ converting sections in order to adjust the arrangement of output pulses of the respective Δ-Σ converting sections. Hereinafter, it will be described how the switching control section of this preferred embodiment works with those three Δ-Σ converting sections called a "uv phase Δ-Σ converting section 1201", a "vw phase Δ-Σ converting section 1202" and a "wu phase Δ-Σ converting section 1203", respectively.

The uv phase Δ-Σ converting section 1201 performs a Δ-Σ conversion in response to a uv phase reference signal supplied from the reference sinusoidal wave generating section 301. In the same way, the vw phase and wu phase Δ-Σ converting sections 1202 and 1203 perform a Δ-Σ conversion in response to a vw phase reference signal and a wu phase reference signal, respectively. The output control section 1204 receives the output pulses of the uv phase, vw phase and wu phase Δ-Σ converting sections 1201, 1202 and 1203 and selectively outputs a pulse of only one of these three phases. In this case, the output control section 1204 chooses a pulse of a phase in which the same number of pulses are output in total every period of the output AC voltage. In this preferred embodiment, the arrangement of the pulses is adjusted so that the final output becomes as close to a sinusoidal wave, which reflects a variation in the density of the output pulses of the Δ-Σ converting sections 1201, 1202 and 1203, as possible. In accordance with the output of the output control section 1204, the switching signal output section 701 outputs a control signal to the respective switching elements in the switching section 602 to turn them ON and OFF selectively.

FIG. 13 illustrates the relation between the input high-frequency AC voltage, the output of the converter section 601, the outputs of the respective phases of the switching section 602, and the output waveform of the filters 104 of the respective phases. As shown in FIG. 13, at any time, a half-period portion of the input high-frequency AC voltage is always output to only one phase. Also, as for each of the uv, vw and wu phases, the control operation is performed so that the same number of half-waves are output every period of the input AC voltage.

Generally speaking, the higher the frequency of an input high-frequency AC voltage, the more easily the voltage will be affected by an impedance variation on a transmission line. For that reason, if an output impedance varies with time in response to an input from a high-frequency AC power supply that has been designed based on a predetermined output impedance, then such a variation will cause a decrease in efficiency. According to this preferred embodiment, however, power is always output to only one phase at any point in time, and therefore, the load on the output end never varies with time. As a result, the output impedance on the transmission line can be kept constant and the power can be converted with a decrease in efficiency minimized.

In the above embodiments, each component of the AC converter was illustrated as a block with its own unique function. However, the operation of the AC converter can also get done even by making a processor execute a computer program that defines the processing to be carried out by those functional blocks. Such a program may be stored in a storage medium such as, for example, CD-ROM, DVD-ROM and flash memory. Such a program may also be distributed through telecommunication lines such as the Internet, an intranet and the like.

According to the present invention, a decrease in conversion efficiency, which is often seen when an AC power with a relatively high frequency is converted into an AC power with a relatively low arbitrary frequency, can be minimized. Consequently, the power conversion efficiency can be increased when power is returned from a wireless power transmission system back to a utility grid or when a three-phase motor is controlled directly.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2011-118293 filed May 26, 2011, the entire contents of which are hereby incorporated by reference.

What is claimed is:

1. An AC converter that converts a single-phase input AC voltage with a frequency f0 into a three-phase output AC voltage with a frequency f1 (where f1 is lower than f0), the converter comprising:

a switching section, which converts the input AC voltage in response to a control signal and which outputs the converted voltage to a phase that has been selected in accordance with the control signal;

a filter section, which filters out high frequency components from the converted voltage, thereby converting the converted voltage into the output AC voltage; and a switching control section, which performs a pulse density modulation on a phase-by-phase basis and in response to a reference signal with the frequency f1, which is associated with the output AC voltage of each said phase, synchronously with a zero cross of the input AC voltage, thereby generating the control signal according a pulse generation status by the pulse density modulation and the polarity of the input AC voltage and sending out the control signal to the switching section, wherein the switching section includes a first type of switching element that applies a positive voltage to its associated phase if the polarity of the input AC voltage is positive and a second type of switching element that applies a positive voltage to its associated phase if the polarity of the input AC voltage is negative, and wherein if the polarities of the input AC voltage and the reference signal for use in the pulse density modulation are both positive, the switching control section outputs the control signal to turn the first type of switching element ON, and if the polarities of the input AC voltage and the reference signal for use in the pulse density modulation are negative and positive, respectively, the switching control section outputs the control signal to turn the second type of switching element ON, and if the polarities of the input AC voltage and the reference signal for use in the pulse density modulation are positive and negative, respectively, the switching control section outputs the control signal to turn the second type of switching element ON, and if the polarities of the input AC voltage and the reference signal for use in the pulse density modulation are both negative, the switching control section outputs the control signal to turn the first type of switching element ON.

2. The AC converter of claim 1, wherein the switching control section controls the switching section so as to avoid turning both of the first and second types of switching elements ON at the same time.

3. The AC converter of claim 1, wherein the switching control section changes the ON and OFF states of the respective switching elements at a time interval that is equal to or longer than a minimum ON period and a minimum OFF period that have been set in advance, and wherein the minimum ON period and the minimum OFF period are set to be $n1/2f0$ (where $n1$ is an integer that is equal to or greater than two).

4. The AC converter of claim 1, wherein the switching control section changes the ON and OFF states of the respective switching elements at a time interval that is equal to or shorter than the minimum ON and OFF periods that have been set in advance, and wherein the minimum ON and OFF periods are set to be $n2/2f0$ (where $n2$ is an integer that is equal to or greater than two).

5. The AC converter of claim 1, wherein the switching control section controls the switching section so that a portion of the input AC voltage that covers a half period is always output only to one particular phase.

6. The AC converter of claim 1, wherein the switching control section controls the switching section so that a portion of the input AC voltage that covers a half period is output to each said phase the same number of times every period of the output AC voltage.

7. The AC converter of claim 1, wherein the switching control section includes:

a positive/negative determining section, which determines the polarity of the input AC voltage;

a reference signal generating section, which generates the reference signal;

a $\Delta$-$\Sigma$ converting section, which converts the reference signal into pulses by $\Delta$-$\Sigma$ conversion and which outputs the pulses when the input AC voltage goes zero; and a switching signal output section, which generates the control signal based on the pulses supplied from the $\Delta$-$\Sigma$ converting section and a decision made by the positive/negative determining section and which sends out the control signal to the switching section.

8. An AC converter that converts a single-phase input AC voltage with a frequency $f0$ into a three-phase output AC voltage with a frequency $f1$ (where $f1$ is lower than $f0$), the converter comprising:

a converter section, which converts the input AC voltage into a DC voltage;

a switching section, which converts the DC voltage in response to a control signal and which outputs the converted voltage to a phase that has been selected in accordance with the control signal;

a filter section, which filters out high frequency components from the converted voltage, thereby converting the converted voltage into the output AC voltage; and a switching control section, which performs a pulse density modulation on a phase-by-phase basis and in response to a reference signal with the frequency $f1$, which is associated with the output AC voltage of each said phase, synchronously with a zero cross of the input AC voltage, thereby generating the control signal according a pulse generation status by the pulse density modulation and sending out the control signal to the switching section, wherein the switching section includes a first type of switching element that applies a positive voltage to its associated phase if the polarity of the input AC voltage is positive and a second type of switching element that applies a positive voltage to its associated phase if the polarity of the input AC voltage is negative, and wherein if the polarity of the reference signal for use in the pulse density modulation is positive, the switching control section outputs the control signal to turn the first type of switching element ON, and wherein if the polarity of the reference signal for use in the pulse density modulation is negative, the switching control section outputs the control signal to turn the second type of switching element ON.

9. The AC converter of claim 8, wherein the switching control section controls the switching section so as to avoid turning both of the first and second types of switching elements ON at the same time.

10. The AC converter of claim 8, wherein the switching control section changes the ON and OFF states of the respective switching elements at a time interval that is equal to or longer than a minimum ON period and a minimum OFF period that have been set in advance, and wherein the minimum ON period and the minimum OFF period are set to be $n1/2f0$ (where $n1$ is an integer that is equal to or greater than two).

11. The AC converter of claim 8, wherein the switching control section changes the ON and OFF states of the respective switching elements at a time interval that is equal to or shorter than the minimum ON and OFF periods that have been set in advance, and wherein the minimum ON and OFF periods are set to be $n2/2f0$ (where $n2$ is an integer that is equal to or greater than two).

12. The AC converter of claim 8, wherein the switching control section controls the switching section so that a portion of the input AC voltage that covers a half period is always output only to one particular phase.

13. The AC converter of claim 8, wherein the switching control section controls the switching section so that a portion of the input AC voltage that covers a half period is output to each said phase the same number of times every period of the output AC voltage.

14. The AC converter of claim 8, wherein the switching control section includes:
- a positive/negative determining section, which determines the polarity of the input AC voltage;
- a reference signal generating section, which generates the reference signal;
- a Δ-Σ converting section, which converts the reference signal into pulses by Δ-Σ conversion and which outputs the pulses when the input AC voltage goes zero; and a switching signal output section, which generates the control signal based on the pulses supplied from the Δ-Σ converting section and a decision made by the positive/negative determining section and which sends out the control signal to the switching section.

15. An AC converting method for converting a single-phase input AC voltage with a frequency f0 into a three-phase output AC voltage with a frequency f1 (where f1 is lower than f0), the method comprising the steps of:
- (A) converting the input AC voltage in response to a control signal and outputting the converted voltage to a phase that has been selected in accordance with the control signal;
- (B) filtering out high frequency components from the converted voltage, thereby converting the converted voltage into the output AC voltage;
- (C) performing a pulse density modulation on a phase-by-phase basis and in response to a reference signal with the frequency f1, which is associated with the output AC voltage of each said phase, synchronously with a zero cross of the input AC voltage; and
- (D) generating the control signal according a pulse generation status by the pulse density modulation and the polarity of the input AC voltage, wherein the step (A) includes:
- (A1) applying a positive voltage to its associated phase if the polarity of the input AC voltage is positive; and
- (A2) applying a positive voltage to its associated phase if the polarity of the input AC voltage is negative, and wherein the step (D) includes:
- generating a signal to perform the step (A1) as the control signal if the polarities of the input AC voltage and the reference signal for use in the pulse density modulation are both positive, and
- generating a signal to perform the step (A2) as the control signal if the polarities of the input AC voltage and the reference signal for use in the pulse density modulation are negative and positive, respectively, and
- generating a signal to perform the step (A2) as the control signal if the polarities of the input AC voltage and the reference signal for use in the pulse density modulation are positive and negative, respectively, and
- generating a signal to perform the step (A1) as the control signal if the polarities of the input AC voltage and the reference signal for use in the pulse density modulation are both negative.

16. An AC converting method for converting a single-phase input AC voltage with a frequency f0 into a three-phase output AC voltage with a frequency f1 (where f1 is lower than f0), the method comprising the steps of:
- (A) converting the input AC voltage into a DC voltage;
- (B) converting the DC voltage in response to a control signal and outputting the converted voltage to a phase that has been selected in accordance with the control signal;
- (C) filtering out high frequency components from the converted voltage, thereby converting the converted voltage into the output AC voltage;
- (D) performing a pulse density modulation on a phase-by-phase basis and in response to a reference signal with the frequency f1, which is associated with the output AC voltage of each said phase, synchronously with a zero cross of the input AC voltage; and
- (E) generating the control signal according a pulse generation status by the pulse density modulation, wherein the step (A) includes:
- (A1) applying a positive voltage to its associated phase if the polarity of the input AC voltage is positive; and
- (A2) applying a positive voltage to its associated phase if the polarity of the input AC voltage is negative, and wherein the step (E) includes:
- generating a signal to perform the step (A1) as the control signal if the polarity of the reference signal for use in the pulse density modulation is positive; and
- generating a signal to perform the step (A2) as the control signal if the polarity of the reference signal for use in the pulse density modulation is negative.

17. A non-transitory storage medium that stores a program for converting a single-phase input AC voltage with a frequency f0 into a three-phase output AC voltage with a frequency f1 (where f1 is lower than f0), the program being defined to make a computer perform the steps of:
- (A) converting the input AC voltage in response to a control signal and outputting the converted voltage to a phase that has been selected in accordance with the control signal;
- (B) filtering out high frequency components from the converted voltage, thereby converting the converted voltage into the output AC voltage;
- (C) performing a pulse density modulation on a phase-by-phase basis and in response to a reference signal with the frequency f1, which is associated with the output AC voltage of each said phase, synchronously with a zero cross of the input AC voltage; and
- (D) generating the control signal according a pulse generation status by the pulse density modulation and the polarity of the input AC voltage, wherein the step (A) includes:
- (A1) applying a positive voltage to its associated phase if the polarity of the input AC voltage is positive; and
- (A2) applying a positive voltage to its associated phase if the polarity of the input AC voltage is negative, and wherein the step (D) includes:
- generating a signal to perform the step (A1) as the control signal if the polarities of the input AC voltage and the reference signal for use in the pulse density modulation are both positive, and
- generating a signal to perform the step (A2) as the control signal if the polarities of the input AC voltage and the reference signal for use in the pulse density modulation are negative and positive, respectively, and
- generating a signal to perform the step (A2) as the control signal if the polarities of the input AC voltage and the reference signal for use in the pulse density modulation are positive and negative, respectively, and
- generating a signal to perform the step (A1) as the control signal if the polarities of the input AC voltage and the reference signal for use in the pulse density modulation are both negative.

18. A non-transitory storage medium that stores a program for converting a single-phase input AC voltage with a frequency f0 into a three-phase output AC voltage with a frequency f1 (where f1 is lower than f0), the program being defined to make a computer perform the steps of:
- (A) converting the input AC voltage into a DC voltage;

(B) converting the DC voltage in response to a control signal and outputting the converted voltage to a phase that has been selected in accordance with the control signal;
(C) filtering out high frequency components from the converted voltage, thereby converting the converted voltage into the output AC voltage;
(D) performing a pulse density modulation on a phase-by-phase basis and in response to a reference signal with the frequency f1, which is associated with the output AC voltage of each said phase, synchronously with a zero cross of the input AC voltage; and
(E) generating the control signal according a pulse generation status by the pulse density modulation wherein the step (A) includes:
  (A1) applying a positive voltage to its associated phase if the polarity of the input AC voltage is positive; and
  (A2) applying a positive voltage to its associated phase if the polarity of the input AC voltage is negative, and
wherein the step (E) includes:
  generating a signal to perform the step (A1) as the control signal if the polarity of the reference signal for use in the pulse density modulation is positive; and
generating a signal to perform the step (A2) as the control signal if the polarity of the reference signal for use in the pulse density modulation is negative.

\* \* \* \* \*